US011789156B1

(12) United States Patent
Michaels et al.

(10) Patent No.: US 11,789,156 B1
(45) Date of Patent: Oct. 17, 2023

(54) LIDAR SENSOR SYSTEM

(71) Applicant: Aurora Operations, Inc., Mountain View, CA (US)

(72) Inventors: Andy Michaels, Bozeman, MT (US); Evan Rogers, Bozeman, MT (US)

(73) Assignee: Aurora Operations, Inc., Mountain View, CA (US)

(*) Notice: Subject to any disclaimer, the term of this patent is extended or adjusted under 35 U.S.C. 154(b) by 0 days.

(21) Appl. No.: 17/886,398

(22) Filed: Aug. 11, 2022

(51) Int. Cl.
| | |
|---|---|
| *G01S 17/931* | (2020.01) |
| *G01S 17/06* | (2006.01) |
| *G01S 17/58* | (2006.01) |
| *G01S 7/481* | (2006.01) |
| *B60W 10/20* | (2006.01) |
| *B60W 10/18* | (2012.01) |
| *G02B 26/10* | (2006.01) |
| *G02B 1/02* | (2006.01) |
| *G02B 27/28* | (2006.01) |
| *G02B 5/30* | (2006.01) |

(52) U.S. Cl.
CPC .......... *G01S 17/931* (2020.01); *B60W 10/18* (2013.01); *B60W 10/20* (2013.01); *G01S 7/4817* (2013.01); *G02B 1/02* (2013.01); *G02B 26/101* (2013.01); *G02B 27/286* (2013.01); *B60W 2420/52* (2013.01); *B60W 2554/4042* (2020.02); *B60W 2710/18* (2013.01); *G02B 5/3083* (2013.01)

(58) Field of Classification Search
CPC ....... G01S 17/931; G01S 7/4817; G02B 1/02; G02B 26/101; G02B 27/286; G02B 5/3083; B60W 10/18; B60W 10/20; B60W 2554/4042; B60W 2420/52; B60W 2710/18
USPC ....................................... 359/237
See application file for complete search history.

(56) References Cited

U.S. PATENT DOCUMENTS

| 11,409,000 | B1* | 8/2022 | Behzadi | G01S 17/32 |
| 2022/0187468 | A1* | 6/2022 | Matthews | G01S 17/06 |
| 2022/0196814 | A1* | 6/2022 | Lin | G01S 17/58 |

* cited by examiner

*Primary Examiner* — Collin X Beatty
*Assistant Examiner* — Grant A Gagnon
(74) *Attorney, Agent, or Firm* — FOLEY & LARDNER LLP

(57) ABSTRACT

A light detection and ranging (LIDAR) system for a vehicle includes a transmitter, a receiver, one or more scanning optics, and a circulator. The transmitter is configured to output a transmit beam. The receiver includes a first receive grating coupler and a second receive grating coupler. The circulator is configured to receive the transmit beam and provide the transmit beam to the one or more scanning optics, receive a return beam from reflection of the transmit beam by an object, split the return beam into at least a first component and a second component, and direct the first component to the first receive grating coupler and the second component to the second receive grating coupler.

20 Claims, 17 Drawing Sheets

LIDAR SENSOR SYSTEM

BACKGROUND

Optical detection of range using lasers, often referenced by a mnemonic, LIDAR (for "light detection and ranging"), also sometimes referred to as "laser RADAR," is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) system, such as a LIDAR sensor system for a vehicle. The LIDAR system includes a transmitter configured to output a transmit beam. The LIDAR system includes a receiver. The receiver includes a first receive grating coupler and a second receive grating coupler. The LIDAR system includes one or more scanning optics. The LIDAR system includes a circulator. The circulator is configured to receive the transmit beam and direct the transmit beam to the one or more scanning optics, receive a return beam from reflection of the transmit beam by an object, split the return beam into at least a first component and a second component, and direct the first component to the first receive grating coupler and the second component to the second receive grating coupler.

At least one aspect relates to an autonomous vehicle control system. The autonomous vehicle control system includes a transmitter, a receiver, one or more scanning optics, a circulator, and one or more processors. The transmitter configured to output a transmit beam. The receiver includes a first receive grating coupler and a second receive grating coupler. The circulator is configured to receive the transmit beam and direct the transmit beam to the one or more scanning optics, receive a return beam from reflection of the transmit beam by an object, split the return beam into at least a first component and a second component, and direct the first component to the first receive grating coupler and the second component to the second receive grating coupler. The one or more processors are configured to determine at least one of a range to an object or a velocity of the object based on the first component and the second component, and control operation of an autonomous vehicle responsive to the at least one of the range or the velocity.

At least one aspect relates to an autonomous vehicle. The autonomous vehicle includes a LIDAR system including a transmitter, a receiver, one or more scanning optics, and a circulator. The transmitter configured to output a transmit beam. The receiver includes a first receive grating coupler and a second receive grating coupler. The circulator is configured to receive the transmit beam and direct the transmit beam to the one or more scanning optics, receive a return beam from reflection of the transmit beam by an object, split the return beam into at least a first component and a second component, and direct the first component to the first receive grating coupler and the second component to the second receive grating coupler. The autonomous vehicle includes a steering system, a braking system, and a vehicle controller. The vehicle controller includes one or more processors configured to determine at least one of a range to an object or a velocity of the object based on the first component and the second component, and control operation of an autonomous vehicle responsive to the at least one of the range or the velocity.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

A LIDAR sensor system can generate and transmit a light beam that an object can reflect or otherwise scatter as a return beam corresponding to the transmitted beam. The LIDAR sensor system can receive the return beam, and process the return beam or characteristics thereof to determine parameters regarding the object such as range and velocity. The LIDAR sensor system can apply various frequency or phase modulations to the transmitted beam, which can facilitate relating the return beam to the transmitted beam in order to determine the parameters regarding the object.

The LIDAR sensor system can include a transmitter, a receiver, one or more scanning optics, and a circulator. The transmitter configured to output a transmit beam. The receiver includes a first receive grating coupler and a second receive grating coupler. The circulator is configured to receive the transmit beam and direct the transmit beam to the one or more scanning optics, receive a return beam from reflection of the transmit beam by an object, split the return beam into at least a first component and a second component, and direct the first component to the first receive grating coupler and the second component to the second receive grating coupler. The one or more scanning optics can include mirrors to output the transmit beam, which can be scanned over a field of view to be reflected or otherwise scattered by an object as the return beam, which can be used to determine range, velocity, and Doppler information regarding the object, such as for controlling operation of an autonomous vehicle.

Systems and methods in accordance with the present disclosure can implement LIDAR sensor systems in which a circulator design is assembled with the receive grating couplers along a mechanical scan axis as opposed to along a transmit array axis. This arrangement simplifies the optical design. For example, the circulator optics can be tilted to reduce back reflections. The tilt of the circulator optics can affect the magnitude of displacement of the return beam without affecting the direction of the return beam. Thus, the emission from the grating couplers can be at an angle greater than the tilt of the circulator optics, which improves the process efficiency. For example, this enables the circulator optics to be mounted parallel to the integrated chip that the transmitter and receiver are located on. However, the advantages of the integrated chip described above are not limited to autonomous vehicles. They can be advantageous for any type of vehicles equipped with LIDAR sensors.

1. System Environments for Autonomous Vehicles

Figure 1:
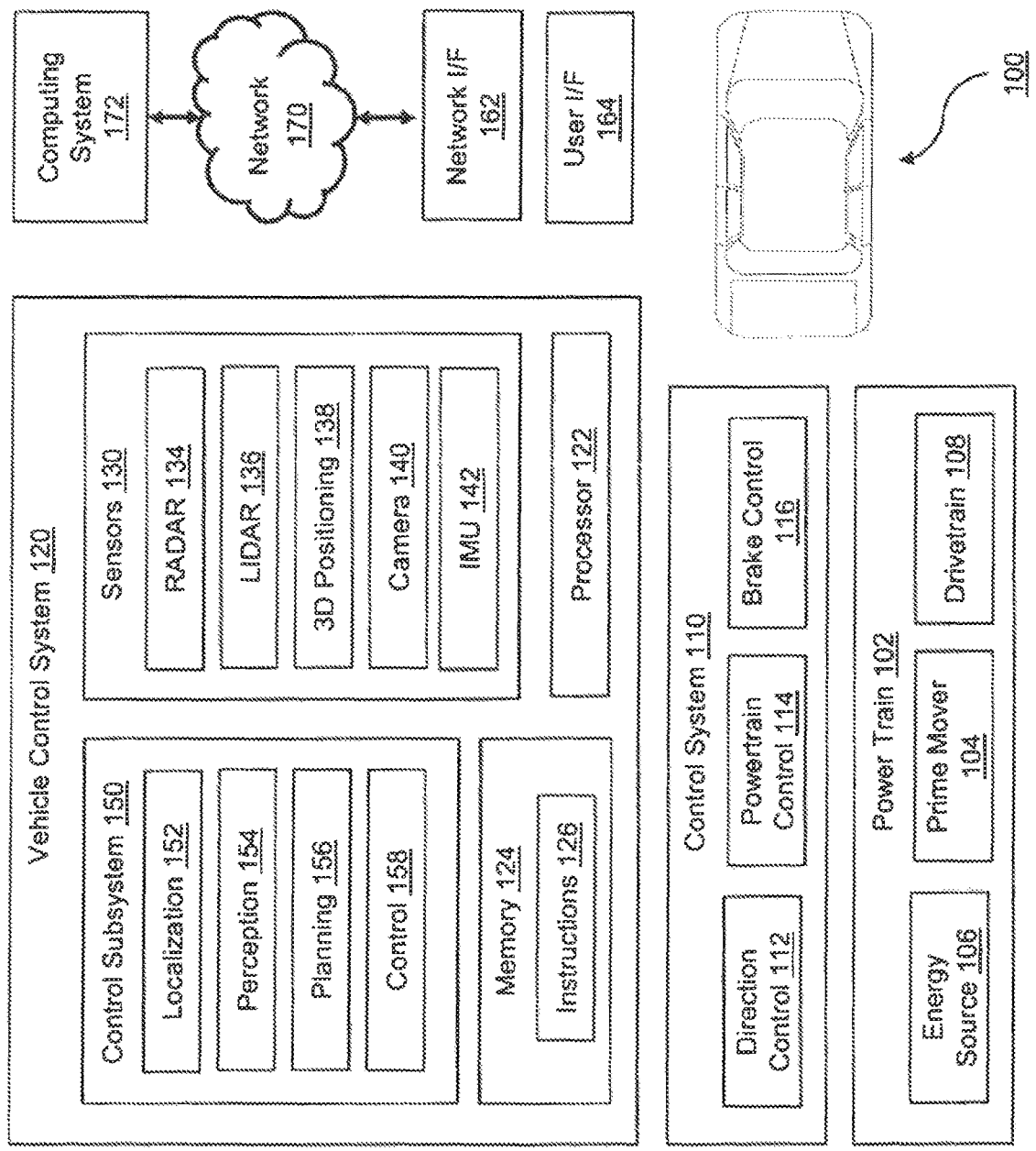
FIG. 1 is a block diagram of an example of a system environment for autonomous vehicles.

FIG. 1 is a block diagram illustrating an example of a system environment for autonomous vehicles according to some implementations. FIG. 1 depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1 can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 5:
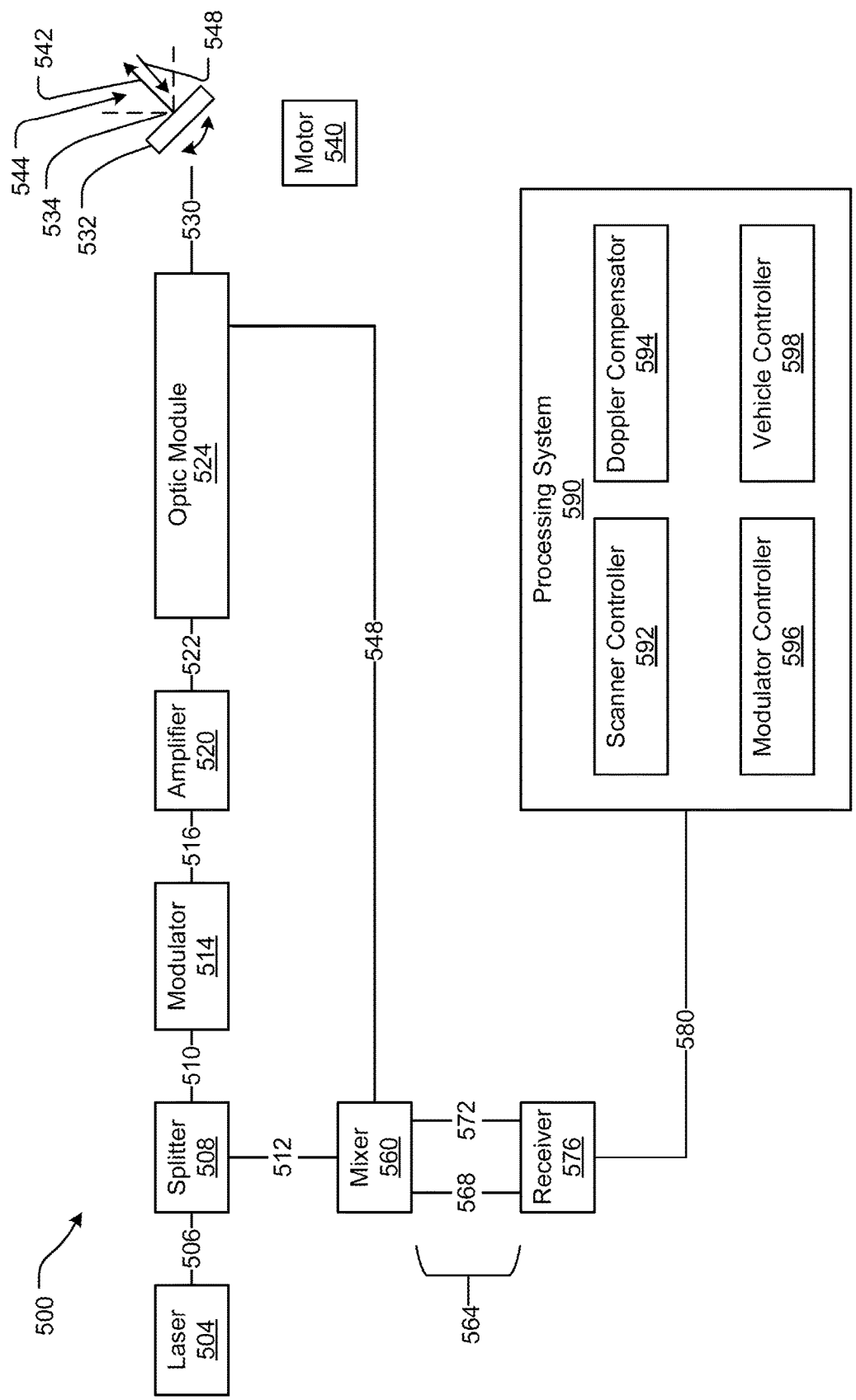
FIG. 5 is a block diagram of an example of a LIDAR sensor system.

A truck can include a LIDAR system (e.g., vehicle control system 120 in FIG. 1, LIDAR sensor system 500 in FIG. 5, among others described herein). In some implementations, the LIDAR sensor system 500 can use frequency modulation to encode an optical signal and scatter the encoded optical signal into free-space using optics. By detecting the frequency differences between the encoded optical signal and a returned signal reflected back from an object, the frequency modulated (FM) LIDAR sensor system can determine the location of the object and/or precisely measure the velocity of the object using the Doppler effect. In some implementations, an FM LIDAR sensor system may use a continuous wave (referred to as, "FMCW LIDAR") or a quasi-continuous wave (referred to as, "FMQW LIDAR"). In some implementations, the LIDAR sensor system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1) of the FM or PM LIDAR sensor system a low amount (e.g., 10% or less) of the light that hit the object. In other instances, an object (e.g., a shiny road sign) may have a high reflectivity (e.g., above 10%), in that it reflects back to the sensors of the FM LIDAR sensor system a high amount of the light that hit the object.

Regardless of the object's reflectivity, an FM LIDAR sensor system may be able to detect (e.g., classify, recognize, discover, etc.) the object at greater distances (e.g., 2×) than a conventional LIDAR sensor system. For example, an FM LIDAR sensor system may detect a low reflectively object beyond 300 meters, and a high reflectivity object beyond 400 meters.

To achieve such improvements in detection capability, the FM LIDAR sensor system may use sensors (e.g., sensors 130 in FIG. 1). In some implementations, these sensors can be single photon sensitive, meaning that they can detect the smallest amount of light possible. While an FM LIDAR sensor system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR sensor system in infrared wavelengths, the FM or PM LIDAR sensor system can broadcast stronger light pulses or light beams than conventional LIDAR sensor systems.

Thus, by detecting an object at greater distances, an FM LIDAR sensor system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR sensor system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR sensor systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR sensor system to determine distant or sparse data points as objects and/or track how those objects are moving over time. For example, an FM LIDAR sensor (e.g., sensors 130 in FIG. 1) may only receive a few returns (e.g., hits) on an object that is 300 m away, but if those return give a velocity value of interest (e.g., moving towards the vehicle at >70 mph), then the FM LIDAR sensor system and/or the autonomous vehicle control system may determine respective weights to probabilities associated with the objects.

Faster identification and/or tracking of the FM LIDAR sensor system gives an autonomous vehicle control system more time to maneuver a vehicle. A better understanding of how fast objects are moving also allows the autonomous vehicle control system to plan a better reaction.

The FM LIDAR sensor system can have less static compared to conventional LIDAR sensor systems. That is, the conventional LIDAR sensor systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR sensor systems often need extra hardware, complex software, and/or more computational power to manage this "noise."

In contrast, FM LIDAR sensor systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR sensor systems produce (e.g., generates, derives, etc.) more accurate data with less hardware or software requirements, enabling smoother driving.

The FM LIDAR sensor system can be easier to scale than conventional LIDAR sensor systems. As more self-driving vehicles (e.g., cars, commercial trucks, etc.) show up on the road, those powered by an FM LIDAR sensor system likely will not have to contend with interference issues from sensor crosstalk. Furthermore, an FM LIDAR sensor system uses less optical peak power than conventional LIDAR sensors. As such, some or all of the optical components for an FM LIDAR can be produced on a single chip, which produces its own benefits, as discussed herein.

2.1 Commercial Trucking

Figure 2:
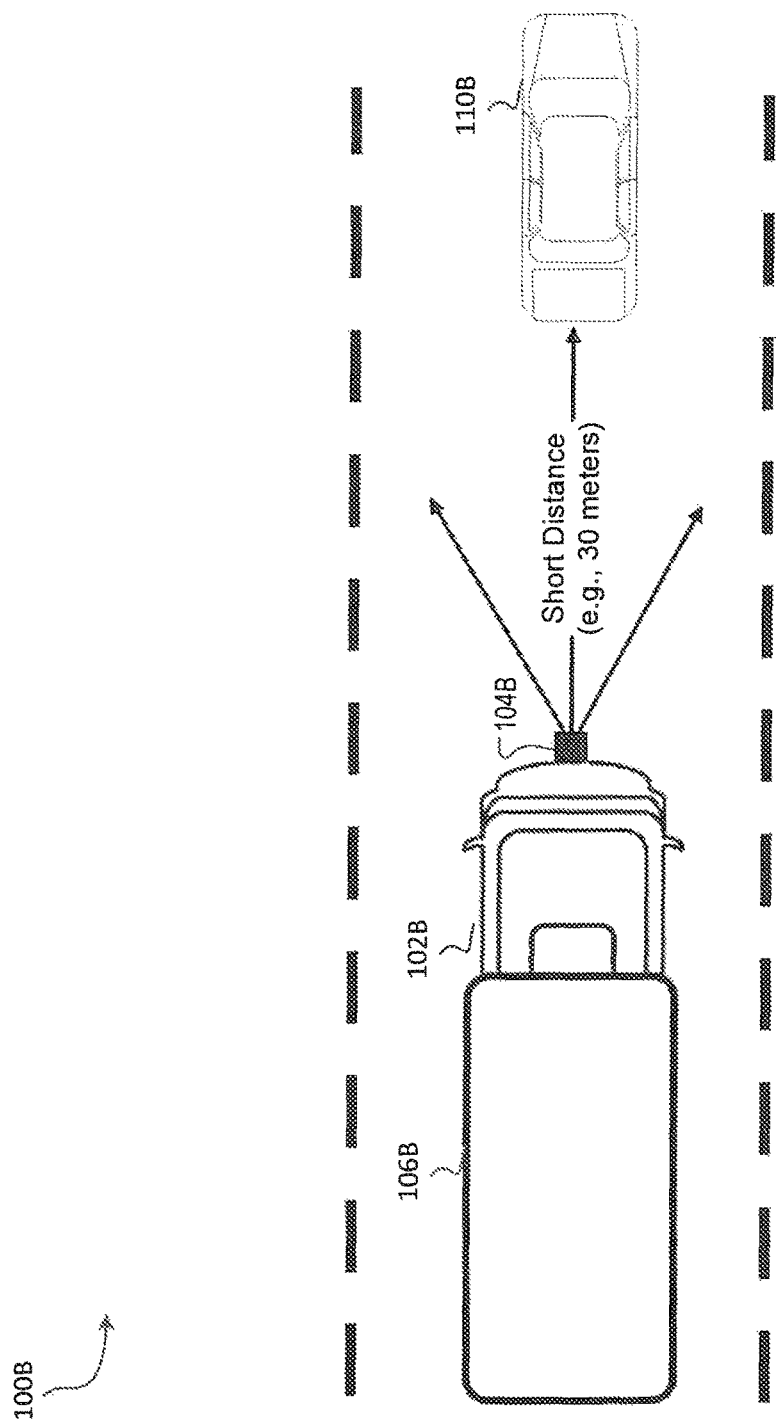
FIG. 2 is a block diagram of an example of a system environment for autonomous commercial trucking vehicles.

FIG. 2 is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 2 as another vehicle) that is within a distance range that is equal to or less than 30 meters from the truck.

The commercial truck 102B may include a LIDAR sensor system 104B (e.g., an FM LIDAR sensor system, vehicle control system 120 in FIG. 1, LIDAR sensor system 500 in FIG. 5) for determining a distance to the object 110B and/or measuring the velocity of the object 110B. Although FIG. 2 shows that one LIDAR sensor system 104B is mounted on the front of the commercial truck 102B, the number of LIDAR sensor system and the mounting area of the LIDAR sensor system on the commercial truck are not limited to a particular number or a particular area. The commercial truck 102B may include any number of LIDAR sensor systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR sensor system 104B in environment 100B may be configured to detect an object (e.g., another vehicle, a bicycle, a tree, street signs, potholes, etc.) at short distances (e.g., 30 meters or less) from the commercial truck 102B.

Figure 3:
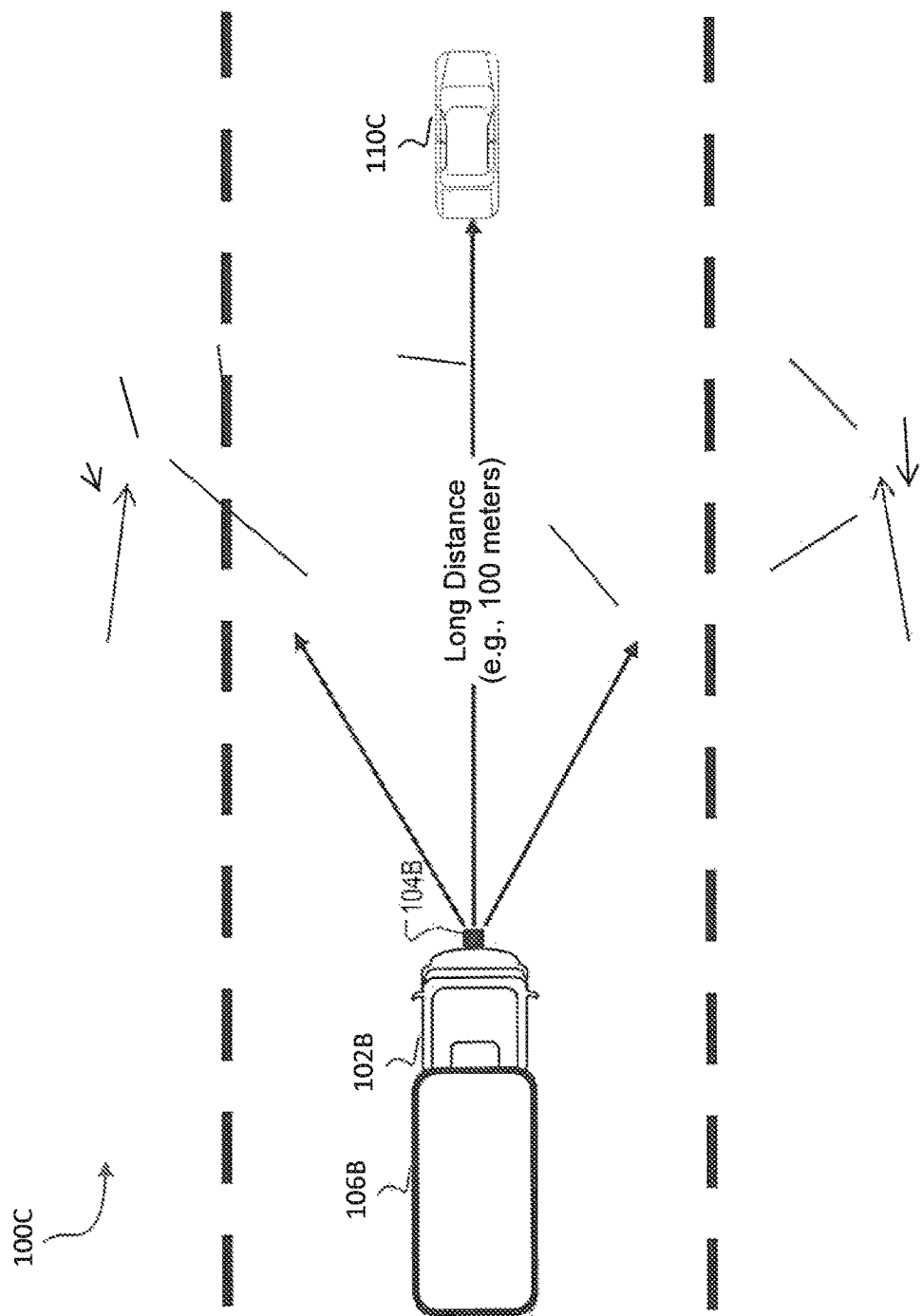
FIG. 3 is a block diagram of an example of a system environment for autonomous commercial trucking vehicles.

FIG. 3 is a block diagram illustrating an example of a system environment for autonomous commercial trucking vehicles, according to some implementations. The environment 100C includes the same components (e.g., commercial truck 102B, cargo 106B, LIDAR sensor system 104B, etc.) that are included in environment 100B.

The environment 100C includes an object 110C (shown in FIG. 3 as another vehicle) that is within a distance range that is (i) more than 30 meters and (ii) equal to or less than 150 meters from the commercial truck 102B. As shown, the LIDAR sensor system 104B in environment 100C may be configured to detect an object (e.g., another vehicle, a bicycle, a tree, street signs, potholes, etc.) at a distance (e.g., 100 meters) from the commercial truck 102B.

Figure 4:
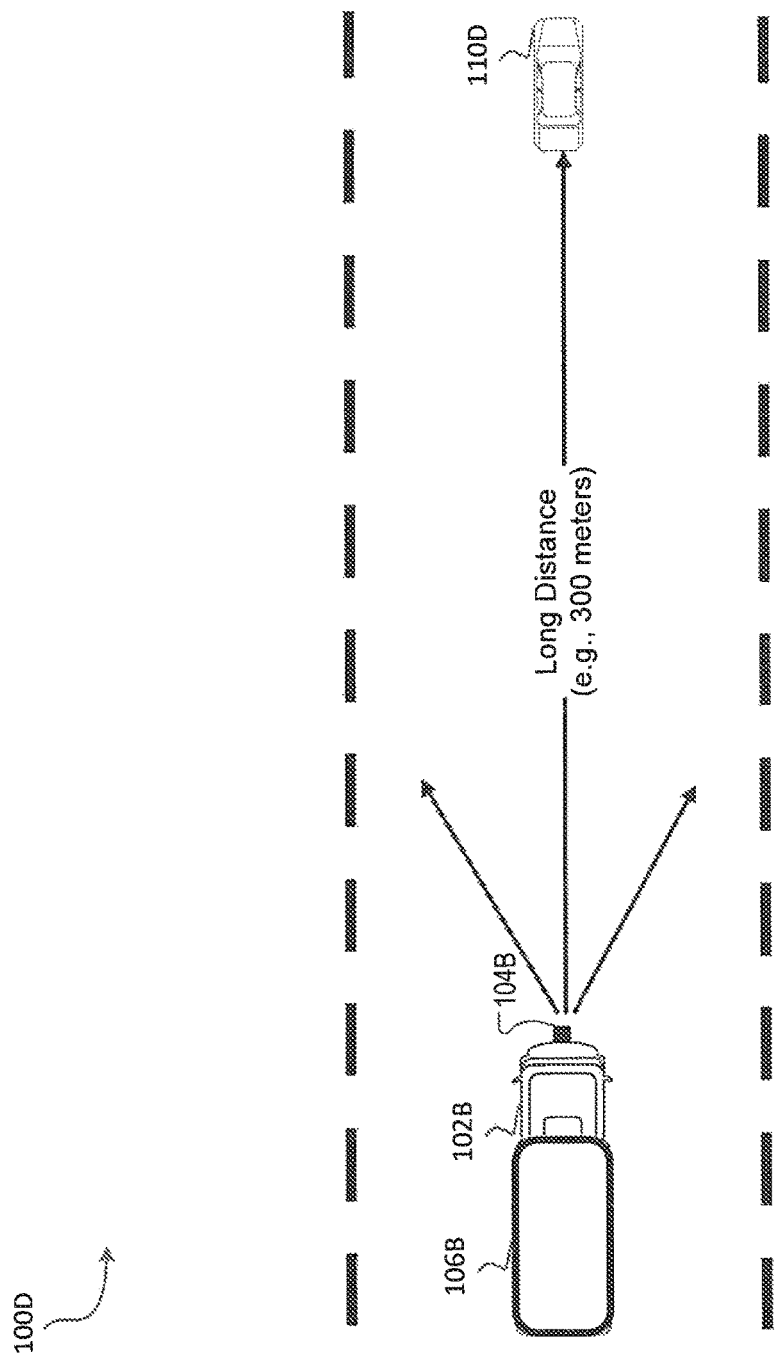
FIG. 4 is a block diagram of an example of a system environment for autonomous commercial trucking vehicles.

FIG. 4 is a block diagram illustrating an example of a system environment for autonomous commercial trucking vehicles, according to some implementations. The environment 100D includes the same components (e.g., commercial truck 102B, cargo 106B, LIDAR sensor system 104B, etc.) that are included in environment 100B.

The environment 100D includes an object 110D (shown in FIG. 4 as another vehicle) that is within a distance range that is more than 150 meters from the commercial truck 102B. As shown, the LIDAR sensor system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR sensor systems (e.g., FMCW and/or FMQW systems) or PM LIDAR sensor systems are well-suited for commercial trucking applications due to the advantages described above. As a result, commercial trucks equipped with such systems may have an enhanced ability to move both people and goods across short or long distances. In various implementations, such FM or PM LIDAR sensor systems can be used in semi-autonomous applications, in which the commercial truck has a driver and some functions of the commercial truck are autonomously operated using the FM or PM LIDAR sensor system, or fully autonomous applications, in which the commercial truck is operated entirely by the FM or LIDAR sensor system, alone or in combination with other vehicle systems.

3. LIDAR Sensor Systems

FIG. 5 depicts an example of a LIDAR sensor system 500. The LIDAR sensor system 500 can be used to determine parameters regarding objects, such as range and velocity, and output the parameters to a remote system. For example, the LIDAR sensor system 500 can output the parameters for use by a vehicle controller that can control operation of a vehicle responsive to the received parameters (e.g., vehicle controller 598) or a display that can present a representation of the parameters. The LIDAR sensor system 500 can be a coherent detection system. The LIDAR sensor system 500 can be used to implement various features and components of the systems described with reference to FIGS. 1-4. The LIDAR sensor system 500 can include components for performing various detection approaches, such as to be operated as an amplitude modular LIDAR system or a coherent LIDAR system. The LIDAR sensor system 500 can be used to perform time of flight range determination. In some implementations, various components or combinations of components of the LIDAR sensor system 500, such as laser source 504 and modulator 514, can be in a same housing, provided in a same circuit board or other electronic component, or otherwise integrated. In some implementations, various components or combinations of components of the LIDAR sensor system 500 can be provided as separate components, such as by using optical couplings (e.g., optical fibers) for components that generate and/or receive optical signals, such as light beams, or wired or wireless electronic connections for components that generate and/or receive electrical (e.g., data) signals.

The LIDAR sensor system 500 can include a laser source 504 that generates and emits a beam 506, such as a carrier wave light beam. A splitter 508 can split the beam 506 into a beam 510 and a reference beam 512 (e.g., reference signal). In some implementations, any suitable optical, electronic, or opto-electronic elements can be used to provide the beam 510 and the reference beam 512 from the laser source 504 to other elements.

A modulator 514 can modulate one or more properties of the input beam 510 to generate a beam 516 (e.g., target beam). In some implementations, the modulator 514 can modulate a frequency of the input beam 510 (e.g., optical frequency corresponding to optical wavelength, where c=λv, where c is the speed of light, λ is the wavelength, and v is the frequency). For example, the modulator 514 can modulate a frequency of the input beam 510 linearly such that a frequency of the beam 516 increases or decreases linearly over time. As another example, the modulator 514 can modulate a frequency of the input beam 510 non-linearly (e.g., exponentially). In some implementations, the modulator 514 can modulate a phase of the input beam 510 to generate the beam 516. However, the modulation techniques are not limited to the frequency modulation and the phase modulation. Any suitable modulation techniques can be used to modulate one or more properties of a beam. Returning to FIG. 5, the modulator 514 can modulate the beam 510 subsequent to splitting of the beam 506 by the splitter 508, such that the reference beam 512 is unmodulated, or the modulator 514 can modulate the beam 506 and provide a modulated beam to the splitter 508 for the splitter 508 to split into a target beam and a reference beam.

The beam 516, which is used for outputting a transmitted signal, can have most of the energy of the beam 506 outputted by the laser source 504, while the reference beam 512 can have significantly less energy, yet sufficient energy to enable mixing with a return beam 548 (e.g., returned light) scattered from an object. The reference beam 512 can be used as a local oscillator (LO) signal. The reference beam 512 passes through a reference path and can be provided to a mixer 560. An amplifier 520 can amplify the beam 516 to output a beam 522.

The LIDAR sensor system 500 can include an optic module 524, which can receive the beam 522. The optic module 524 can be a free space optic. For example, the optic module 524 can include one or more optics (e.g., lenses, mirrors, waveguides, grating couplers, prisms, waveplates) arranged to have a gap (e.g., air gap) between the one or more optics, allowing for free space transmission of light (e.g., rather than all light being coupled between optics by fibers). The optic module 524 can perform functions such as collimating, filtering, and/or polarizing the beam 522 to output a beam 530 to optics 532 (e.g., scanning optics).

Figure 6:
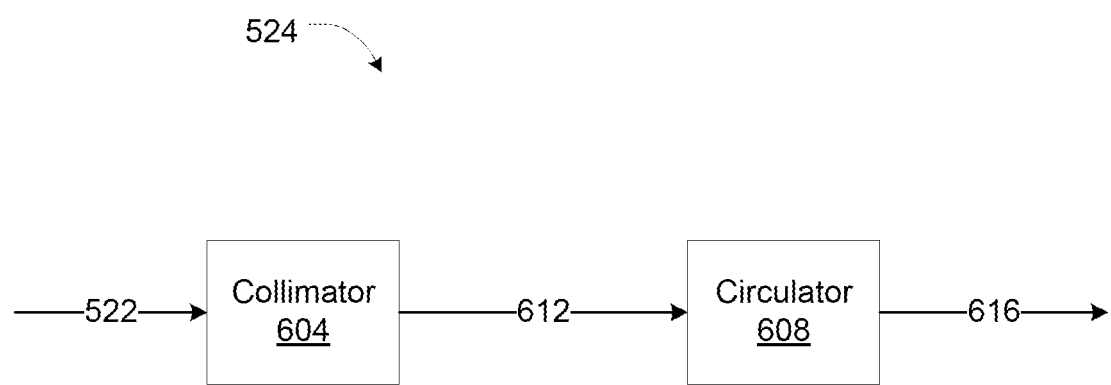
FIG. 6 is a block diagram of an example of an optic module of a LIDAR sensor system.

Referring to FIG. 6, the optic module 524 can include at least one collimator 604 and at least one circulator 608. For example, the circulator 608 can be between the collimator 604 and the optics 532 of FIG. 5. The circulator 608 can receive a collimated beam 612 outputted by the collimator 604 and output a beam 616 (e.g., the beam 530 depicted in FIG. 5) to the optics 532. In some implementations, the circulator 608 can be between the laser source 504 and the collimator 604. At least one of the collimator 604 or the circulator 608 can be free space optics (and can be coupled with one another in free space), such as by being optically coupled via air gaps rather than optical fibers.

Referring further to FIG. 5, the optic module 524 can receive return beam 548 from the optics 532 and provide the return beam 548 to the mixer 560. The optics 532 can be scanning optics, such as one or more steering mirrors or polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light.

The optics 532 can define a field of view 544 that corresponds to angles scanned (e.g., swept) by the beam 542 (e.g., a transmitted beam). For example, the beam 542 can be scanned in the particular plane, such as an azimuth plane or elevation plane (e.g., relative to an object to which the LIDAR sensor system 500 is coupled, such as an autonomous vehicle). The optics 532 can be oriented so that the field of view 544 sweeps an azimuthal plane relative to the optics 532.

At least one motor 540 can be coupled with the optics 532 to control at least one of a position or an orientation of the optics 532 relative to the beam 530. For example, where the optics 532 include a reflector or deflector, the motor 540 can rotate the optics 532 so that surfaces of the optics 532 at which the beam 530 is received vary in angle or orientation relative to the beam 530, causing the beam 542 to be varied in angle or direction as the beam 542 is outputted from the optics 532.

The beam 542 can be outputted from the optics 532 and reflected or otherwise scattered by an object (not shown) as a return beam 548 (e.g., return signal). The return beam 548 can be received on a reception path, which can include the circulator 528, and provided to the mixer 560.

The mixer 560 can be an optical hybrid, such as a 90 degree optical hybrid. The mixer 560 can receive the reference beam 512 and the return beam 548, and mix the reference beam 512 and the return beam 548 to output a signal 564 responsive to the reference beam 512 and the return beam 548. The signal 564 can include an in-phase (I) component 568 and a quadrature (Q) component 572.

The LIDAR sensor system 500 can include a receiver 576 that receives the signal 564 from the mixer 560. The receiver 576 can generate a signal 580 responsive to the signal 564, which can be an electronic (e.g., radio frequency) signal. The receiver 576 can include one or more photodetectors that output the signal 580 responsive to the signal 564.

The LIDAR sensor system 500 can include a processing system 590, which can be implemented using features of the vehicle control system 120 described with reference to FIG. 1. The processing system 590 can process data received regarding the return beam 548, such as the signal 580, to determine parameters regarding the object such as range and velocity. The processing system 590 can include a scanner controller 592 that can provide scanning signals to control operation of the optics 532, such as to control the motor 540 to cause the motor 540 to rotate the optics 532 to achieve a target scan pattern, such as a sawtooth scan pattern or step function scan pattern. The processing system 590 can include a Doppler compensator 594 that can determine the sign and size of a Doppler shift associated with processing the return beam 548 and a corrected range based thereon along with any other corrections. The processing system 590 can include a modulator controller 596 that can send one or more electrical signals to drive the modulator 514.

The processing system 590 can include or be communicatively coupled with a vehicle controller 598 to control operation of a vehicle for which the LIDAR sensor system 500 is installed (e.g., to provide complete or semi-autonomous control of the vehicle). For example, the vehicle controller 598 can be implemented by at least one of the LIDAR sensor system 500 or control circuitry of the vehicle. The vehicle controller 598 can control operation of the vehicle responsive to at least one of a range to the object or a velocity of the object determined by the processing system 590. For example, the vehicle controller 598 can transmit a control signal to at least one of a steering system or a braking system of the vehicle to control at least one of speed or direction of the vehicle.

Figure 7:
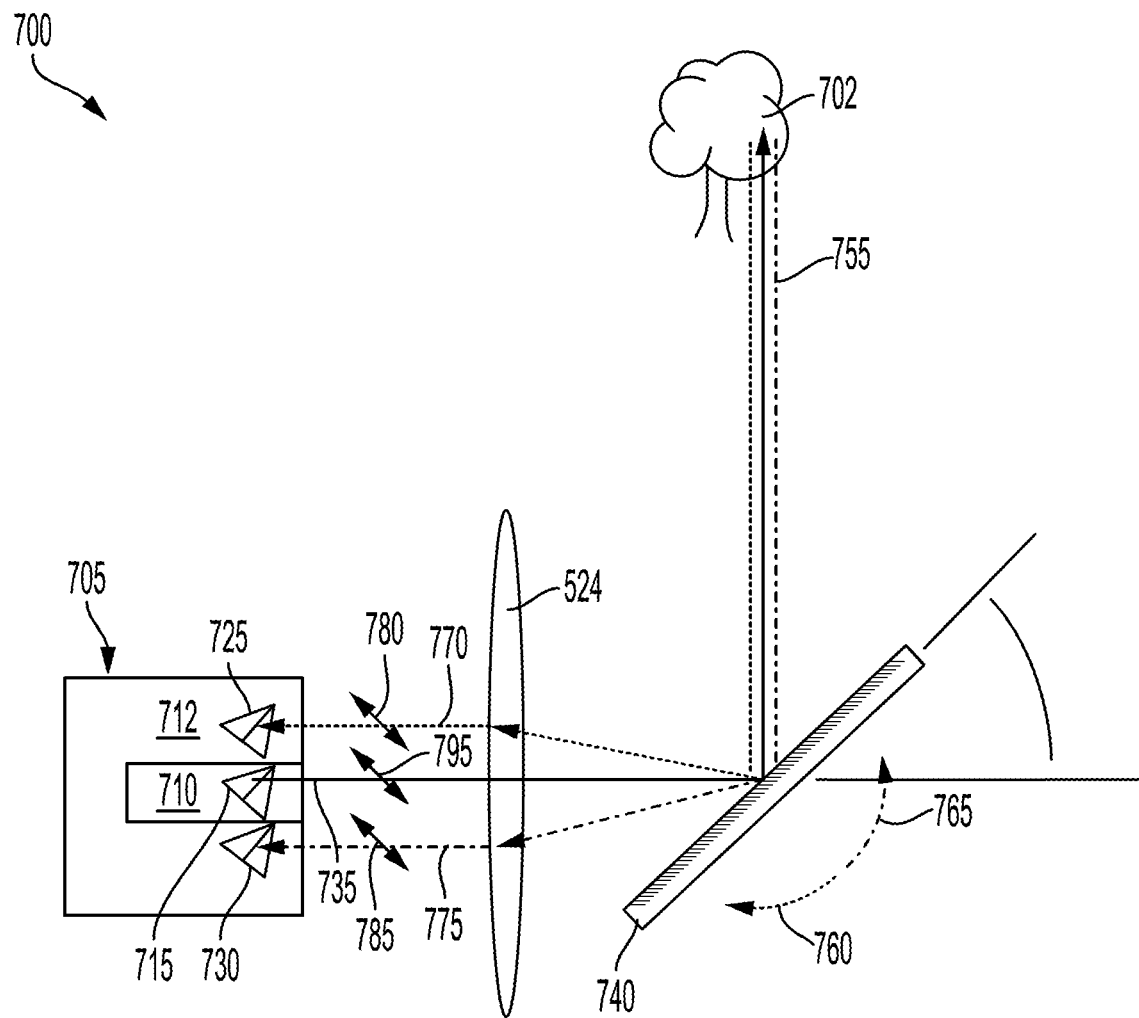
FIG. 7 is a block diagram of an example of a LIDAR sensor system.

3.1 LIDAR Sensor System Including Grating Couplers for Multiple Direction Reception FIG. 7 depicts a block diagram of an example of a LIDAR sensor system 700. The LIDAR sensor system 700 can incorporate features of the LIDAR sensor system 500 and optic module 524 described with reference to FIGS. 5 and 6, respectively. The LIDAR sensor system 700 can facilitate pitch-catch compensation, i.e. accounting for time delays or other offsets resulting from the round-trip path of the transmit beam outputted from the LIDAR sensor system 700, reflected or otherwise scattered by object(s), and then returned as the return beam to the LIDAR sensor system 700 for detection and processing, which might otherwise affect characteristics of the LIDAR sensor system 700 such as signal-to-noise ratio.

The LIDAR sensor system 700 can include a chip 705 on which various components of the LIDAR sensor system 700, including transmitter 710 and receiver 712, can be provided. For example, the chip 705 can be a photonic integrated chip, such that various components of the LIDAR sensor system 700 for generating, modulating, and processing optical signals and performing photonic operations are implemented by the chip 705. The chip 705 can be a semiconductor circuit chip. The chip 705 can be made from at least one III-V semiconductor material. For example, the chip 705 can be made from a silicon material or pure silicon. The chip 705 can be made from gallium nitride. The chip 705 can be made from aluminum nitride. The chip 705 can be made from gallium nitride and pure silicon.

The LIDAR sensor system 700 includes at least one transmitter 710. The transmitter 710 can receive a beam (e.g., various beams described with reference to FIGS. 5 and 6) and output transmit beam 735 with particular characteristics such as direction, polarization, or various combinations thereof.

The transmitter 710 can include at least one grating coupler 715 (e.g., a first grating coupler). The grating coupler 715 can be a structure having a plurality of spaced apart channels, such as parallel channels, which may have various shapes of the same or differing sizes. The grating coupler 715 can be a structure formed by etching on the chip 705. The grating coupler 715 can be a structure formed by deposition of material on the chip 705.

The grating coupler 715 can be configured to couple light off of the chip 705, such as into free space away from the chip 705. For example, the grating coupler 715 can couple light off of the chip 705 in a two-dimensional pattern, such as a two-dimensional polarization. As such, the grating coupler 715 can output a transmit beam 735, such as based on a beam outputted by laser source 504.

The grating coupler 715 can output the transmit beam 735 to have a transmit polarization 795. For example, various components upstream or downstream of the grating coupler 715 (e.g., optic module 524) can be used to control the polarization of the transmit beam 735.

The LIDAR sensor system 700 can include at least one scanner 740, e.g., a steering mirror. For example, referring briefly to FIG. 5, the scanner 740 can be coupled with the motor 540, so that the scanner 740 can be rotated relative to the direction along which the transmit beam 735 is directed towards the scanner 740.

The scanner 740 can scan bi-directionally. For example, the scanner 740 can scan in a first direction 760 and a second direction 765 (e.g., relative to axis 534 described with reference to FIG. 5). The scanner 740 can receive the transmit beam 735 from the transmitter 710 and direct the transmit beam 735 towards the environment around the LIDAR sensor system 700. As depicted in FIG. 7, an object 702 can be present in the environment. The scanner 740 can receive a return beam 755 from reflection or scattering of the transmit beam 735 by the object 702. In the time it takes for the transmit beam 735 to reach the object 702 and the return beam 755 to return from the object 702 to the scanner 740, the scanner 740 may have rotated by a particular angle, as discussed more below. The scanner 740 can provide the return beam 755 to the receiver 712.

The receiver 712 can include a plurality of grating couplers. For example, the receiver 712 can include a grating coupler 725 and a grating coupler 730. The grating couplers 725, 730 can be provided or formed in a manner similar to or identical to the grating coupler 715. The grating couplers 715, 725, 730 can be arranged in an array on the chip 705 (e.g., at least two parallel spaced-apart lines can extend through each of the grating couplers 715, 725, 730). The grating couplers 715, 725, 730 can be arranged in a focal plane of at least one of the scanner 740 or one or more optical components between the grating couplers 715, 725, 730 and the scanner 740.

The grating couplers 725, 730 can be spaced from the grating coupler 715. For example, the grating coupler 725 can be spaced from the grating coupler 715 by a first spacing (e.g., first distance). The first spacing can be associated with a first target range from the scanner 740 for detecting the object 702. For example, the first target range can be within a range of distances from the scanner 740 for which an expected signal to noise ratio of determining at least one of range to or velocity of the object 702 is greater than a threshold signal to noise ratio. The first spacing can be between about 12 micrometers (μm) and about 16 μm. For example, the grating coupler 725 can be spaced from the grating coupler 715 by about 14 μm.

The grating coupler 730 can be spaced from the grating coupler 715 by a second spacing (e.g., second distance). The second spacing can be associated with a second target range from the scanner 740. The second target range can be greater than the first target range. The second spacing can be between about 10 μm and about 20 μm. For example, the grating coupler 730 can be spaced from the grating coupler 715 by about 12 micrometers.

The grating couplers 725, 730 can receive the return beam 755 provided by the scanner 740. The grating couplers 725, 730 can couple light, e.g., the return beam 755, from free space onto the chip 705. As previously mentioned, the scanner 740 can rotate in the time it takes for the transmit beam 735 to travel to the object 702 and be returned as the return beam 755 to the receiver 712, which can result in an angular displacement of the return beam 755 in the direction the scanner 740 is scanning. The angular displacement can manifest as a translation in the focal plane when the return beam 755 is provided to the receiver 712. The translation can be referred to as focal plane drift. Since the grating couplers 725, 730 can couple light on the chip 705 and are distinct and spatially separated, the grating couplers 725, 730 can be provided for two directions of focal plane drift. Additionally, the translational distance can be optimized for a target time for the transmit beam 735 to travel to the object 702 and the return beam 755 to return from the object 702 to the receiver 712, and thus a specific range to the object 702 (because the velocity of the transmit beam 735 and the return beam 755 is known).

The return beam 755 can have components associated with various polarizations, such as based on how the transmit beam 735 is outputted and/or passed through devices such as optic module 524. As such, the scanner 740 can provide a first component 770 of the return beam 755, which can be associated with a first polarization 780, and the grating coupler 725 can receive the first component 770 of the return beam 755. The scanner 740 can provide a second component 775 of the return beam 755 associated with a second polarization 785, and the grating coupler 730 can receive the second component 775.

The first polarization 780 can be different than the second polarization 785. The transmit polarization 795 can be the same as the first polarization 780. For example, the grating coupler 715 can output the transmit beam 735 at the first polarization 780. The grating couplers 725, 730 can receive the return beam 755 at the first polarization 780 or at the second polarization 785. The second polarization 785 can be orthogonal to the first polarization 780.

The grating couplers 725, 730 can be configured to only receive a single polarization of a beam, e.g., light. The grating couplers 725, 730 can receive light of different polarizations. For example, the grating coupler 725 can receive light of the same polarization as that of the transmit beam 735 and the grating coupler 730 can receive light of a polarization orthogonal to the polarization of the transmit beam 735. The grating couplers 725, 730 can be configured to receive the same polarization of light as each other. For example, the grating couplers 725, 730 can receive light (only) of a polarization orthogonal to the polarization of the transmit beam 735, as depicted in FIG. 7, or that is the same as the polarization of the transmit beam 735.

The receiver 712 can output at least one signal based on the first component 770 of the return beam 755 received by the grating coupler 725 and based on the second component 775 of the return beam 755 received by the grating coupler 730. The at least one signal outputted by the receiver 712 can be used by various systems described herein, such as the vehicle control system 120, to determine at least one of a range to or a velocity of the object 702, such as to control operation of an autonomous vehicle responsive to the at least one of the range or the velocity.

Figure 8:
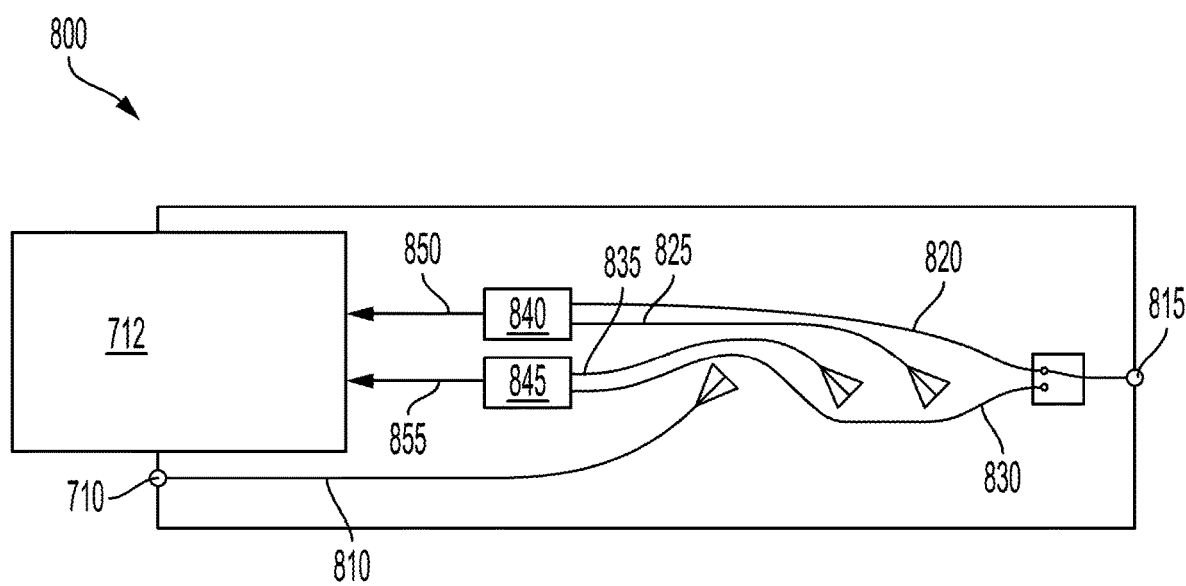
FIG. 8 is a block diagram of an example of optical components of a system.

FIG. 8 is a block diagram of an example of optical components of a system 800. The system 800 can include components of and/or be used to implement various LIDAR sensor systems described herein, such as the transmitter 710 and the receiver 712. For example, the system 800 can be used to implement a receiver of a single polarization, and a switched local oscillator.

As depicted in FIG. 8, the system 800 can include a transmit antenna 810, which can be implemented by the grating coupler 715 of the transmitter 710. For example, the transmit antenna 810 can be an optical antenna integrated onto the chip 705. The transmit antenna 810 can couple the transmit beam 735 into free space. The transmit antenna 810 can be oriented at an angle relative to a surface on which the transmit antenna 810 is provided corresponding to the polarization of the transmit beam 735.

The system 800 can include a local oscillator 815. The local oscillator 815 can output local oscillator (LO) signals. For example, the local oscillator 815 can actively switch the LO signal between at least two mixers, as discussed more below, based on the scanning direction of the scanner 740. For example, the local oscillator 815 can output a first LO signal and a second LO signal. The LO signals can be similar to or the same as reference beam 512. For example, the local oscillator 815 can transmit the first LO signal, e.g., a reference beam 820. The local oscillator 815 can transmit the second LO signal, e.g., a reference beam 830. By the local oscillator 815 switching the LO signal, the amount of power required by the local oscillator 815 can be reduced.

The system 800 can include a receive antenna 825 of the receiver 712. The receive antenna 825 can be implemented by the grating coupler 725 of the receiver 712. For example, the receive antenna 825 can be an optical antenna integrated onto the chip 705. The receive antenna 825 can couple the first component 770 of the return beam 755 onto the chip 705 from free space. The receive antenna 825 can be oriented at an angle relative to a surface on which the receive antenna 825 is provided corresponding to the first polarization 780 of the first component 770 of the return beam 755.

The receive antenna 825 can receive the return beam 755. For example, the receive antenna 825 can receive the first component 770 of the return beam 755. As such, the receive antenna 825 can be oriented at the same polarization as the first component 770 of the return beam 755. For example, the receive antenna 825 can have the same polarization as the first polarization 780. The receive antenna 825 can provide the first component 770 of the return beam 755 to other elements of the system 800, as discussed more below.

The system 800 can include a receive antenna 835 of the receiver 712. The receive antenna 835 can be implemented by the grating coupler 730 of the receiver 712. For example, the receive antenna 835 can be an optical antenna integrated onto the chip 705. The receive antenna 835 can couple the second component 775 of the return beam 755 onto the chip 705 from free space. The receive antenna 835 can be oriented at an angle relative to a surface on which the receive antenna 835 is provided corresponding to the second polarization 785 of the second component 775 of the return beam 755.

The receive antenna 835 can receive the return beam 755. For example, the receive antenna 835 can receive the second component 775 of the return beam 755. As such, the receive antenna 835 can be oriented at the same polarization as the second component 775 of the return beam 755. For example, the receive antenna 835 can have the same polarization as the second polarization 785. The receive antenna 835 can provide the second component 775 of the return beam 755 to other elements of the system 800, as discussed more below The system 800 can include at least one mixer. The mixer can be similar to or the same as the mixer 560. For example, the system 800 can include a mixer 840, which functions similar to the mixer 560. For example, the system 800 can include a mixer 845, which functions similar to the mixer 560. The mixers 840, 845 can each be a 2×2 optical mixer. The mixers 840, 845 can each be an optical hybrid. For example, the mixers 840, 845 can each be a 90 degree optical hybrid. For example, the mixers 840, 845 can each be a 2×4 optical hybrid.

The mixers 840, 845 can receive signals. For example, the mixer 840 can receive the reference beam 820, e.g., the first LO signal. For example, the mixer 840 can receive the first component 770 of the return beam 755 from the receive antenna 825. For example, the mixer 845 can receive the reference beam 830, e.g., the second LO signal. For example, the mixer 845 can receive the second component 775 of the return beam 755 from the receive antenna 835.

The mixers 840, 845 can each output a signal. For example, the output signals can be based on the signals that each of the mixers 840, 845 received from the receive antennas 825, 835. For example, the output signals can be based on the signals that each of the mixers 840, 845 received from the local oscillator 815. For example, the mixers 840, 845 can output signals responsive to the return beam 755 and the reference beams 820, 830. For example, the mixers 840, 845 can mix the return beam 755 and the reference beams 820, 830 and each output a signal. The mixer 840 can output a signal 850. The signal 850 can be responsive to and based on the first component 770 of the return beam 755 and the reference beam 820. The mixer 845 can output a signal 855. The signal 855 can be responsive to and based on the second component 775 of the return beam 755 and the reference beam 830. The mixers 840, 845 can provide the signals 850, 855 to the grating couplers 725, 730, respectively, such as for the grating couplers 725, 730 to provide the components 770, 775 of the return beam 755 to optical detection devices, such as one or more photodetectors of the receiver 712.

Figure 9:
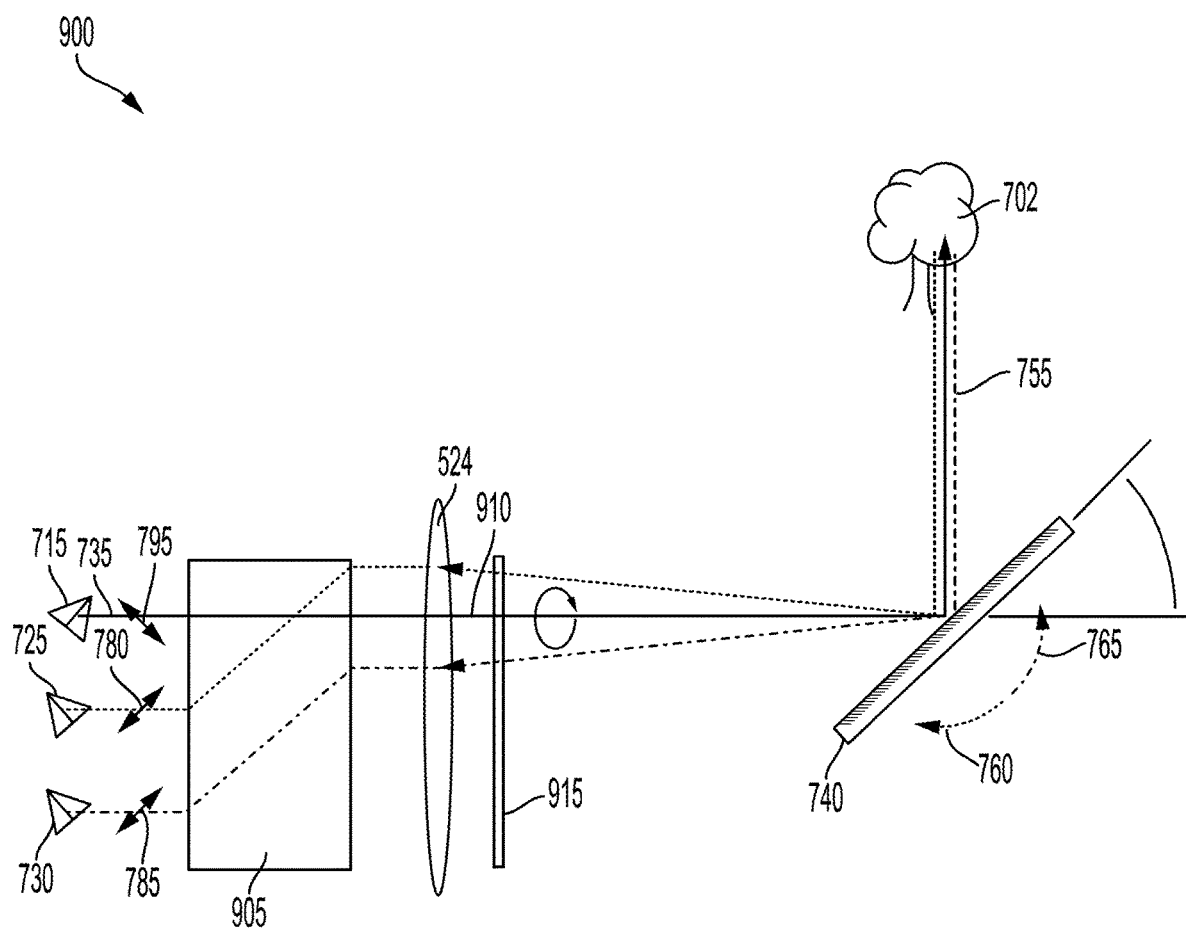
FIG. 9 is a block diagram of an example of a LIDAR sensor system including the optical components of FIG. 8.

FIG. 9 is a block diagram of an example of a LIDAR sensor system 900 including the optical components of FIG. 8. The LIDAR sensor system 900 can incorporate features of the LIDAR sensor system 500 and optic module 524 described with reference to FIGS. 5 and 6, respectively. The LIDAR sensor system 900 can facilitate pitch-catch compensation, including accounting for time delays or other offsets resulting from the round-trip path of the transmit beam outputted from the LIDAR sensor system 900, reflected or otherwise scattered by object(s), and then returned as the return beam to the LIDAR sensor system 900 for detection and processing, which might otherwise affect characteristics of the LIDAR sensor system 900 such as signal-to-noise ratio.

The LIDAR sensor system 900 can include the grating coupler 715 configured to output the transmit beam 735. The LIDAR sensor system 900 can include the scanner 740 configured to receive the transmit beam 735 from the transmitter 710, provide the transmit beam 735 to the environment, and receive the return beam 755 of reflection of the transmit beam 735 from the object 702. The LIDAR sensor system 900 can include the grating coupler 725 and the grating coupler 730. The grating coupler 725 can receive the first component 770 of the return beam 755 at the first polarization 780. The grating coupler 730 can receive the second component 775 of the return beam 755 at the second polarization 785.

The first polarization 780 can be the same as the second polarization 785. The transmit polarization 795 can be different than the first polarization 780 and the second polarization 785. For example, the grating coupler 715 can output the transmit beam 735 at the transmit polarization 795 and the grating couplers 725, 730 can receive the components 770, 775 of the return beam 755 with the polarizations 780, 785 each orthogonal to the transmit polarization 795.

The LIDAR sensor system 900 can include a displacer 905. The transmit beam 735 can pass unaffected through the displacer 905. The displacer 905 can be a birefringent displacer such that the displacer 905 has two different refractive indices (various features and examples of the displacer 905 are described further herein). The displacer 905 can displace the return beam 755. For example, the displacer 905 can displace the return beam 755 in the opposite polarization to the transmit beam 735 by a fixed amount. For example, the displacer 905 can displace the return beam 755 to the right, e.g., relative to the orientation of the array during operation, of the transmit antenna 810 upon receive. The receive antennas 825, 835 are aligned with the polarizations 780, 785 of the components 770, 775 of the return beam 755. The receive antennas 825, 835 are located on either side of the displaced return beam 755 such that they compensate for the focal plane drift, discussed above, at the specific target distance, e.g., the range of the object 702 to the scanner 740.

The LIDAR sensor system 900 can include optic module 524 (e.g., collimator 604 of optic module 524). The collimator 604 can be positioned between the transmitter 710 and the scanner 740. The transmit beam 735 can pass unaffected through the collimator 604. For example, the collimator 604 can be configured to provide the transmit beam 735 to the scanner 740. The collimator 604 can be configured to collimate the transmit beam 735. The collimator 604 can be configured to provide the collimated beam 910 to other components of the LIDAR sensor system 900, as discussed more below. For example, the collimator 604 can be configured to provide the collimated beam 910 to the scanner 740.

The LIDAR sensor system 900 can include a wave plate 915. The wave plate 915 can be a quarter wave plate. The transmit beam 735 can pass unaffected through the wave plate 915. The wave plate 915 can induce circular polarization. For example, the wave plate 915 can circularly polarize the components 770, 775 of the return beam 755.

Figure 10:
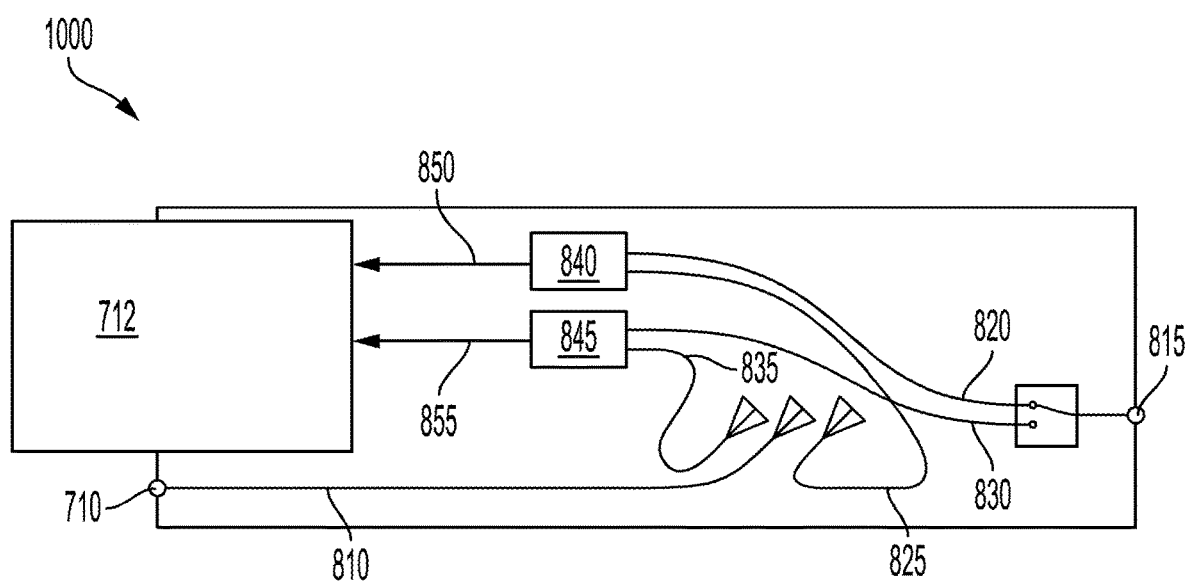
FIG. 10 is a block diagram of an example of optical components of a system.

FIG. 10 is a block diagram of an example of optical components of a system 1000. The system 1000 can include components of and/or be used to implement various LIDAR sensor systems described herein, such as the transmitter 710 and the receiver 712. For example, the system 1000 can be used to implement a receiver of a single polarization, and a switched local oscillator.

The system 1000 is similar to the system 800. However, the polarizations of the receive antennas 825, 835 are aligned with the polarization of the transmit antenna 810. As mentioned above, the transmit antenna 810 can have the same polarization as the transmit polarization 795, the receive antenna 825 can have the same polarization as the first polarization 780, and the receive antenna 835 can have the same polarization as the second polarization 785. In system 1000, the transmit polarization 795 can be the same as the polarizations 780, 785 such that the transmit antenna 810 can have the same polarization as the receive antennas 825, 835.

These receive antennas 825, 835 can be positioned on either side of the transmit antenna 810. For example, the receive antennas 825, 835 and the transmit antenna 810 can be positioned along the direction of the focal plane drift, discussed above. The physical proximity of the receive antennas 825, 835 to the transmit antenna 810 is selected to compensate for the focal plane drift for the specific target distance, e.g., the range of the object 702 to the scanner 740.

Figure 11:
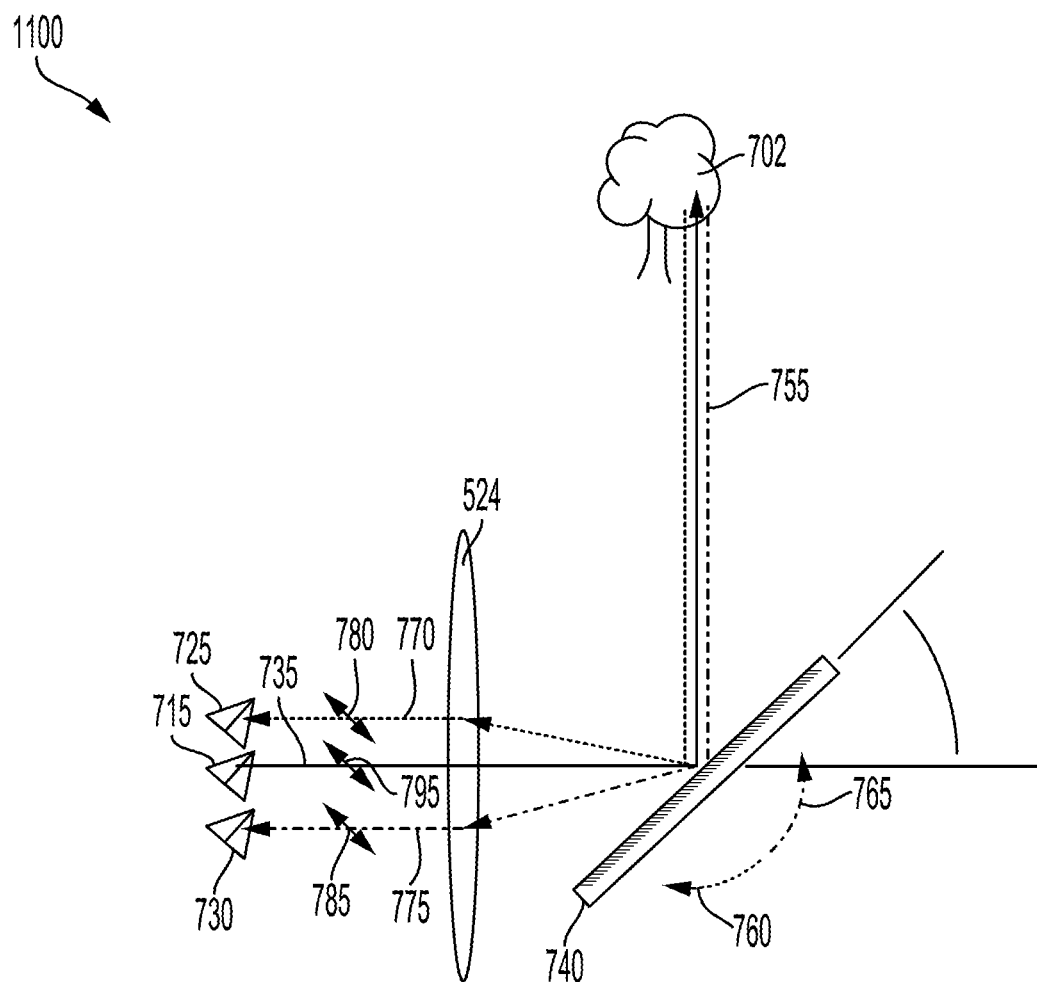
FIG. 11 is a block diagram of an example of a LIDAR sensor system including the optical components of FIG. 10.

FIG. 11 is a block diagram of an example of a LIDAR sensor system 1100 including the optical components of FIG. 10. The LIDAR sensor system 1100 can incorporate features of the LIDAR sensor system 500 and optic module 524 described with reference to FIGS. 5 and 6, respectively. The LIDAR sensor system 1100 can facilitate pitch-catch compensation, i.e. accounting for time delays or other offsets resulting from the round-trip path of the transmit beam outputted from the LIDAR sensor system 1100, reflected or otherwise scattered by object(s), and then returned as the return beam to the LIDAR sensor system 1100 for detection and processing, which might otherwise affect characteristics of the LIDAR sensor system 1100 such as signal-to-noise ratio.

Because the system 1000 is similar to the system 800, except for the polarizations of the receive antennas 825, 835 being aligned with the polarization of the transmit antenna 810, the block diagram depicted in FIG. 11 is similar to the block diagram depicted in FIG. 9. However, since the polarizations of the receive antennas 825, 835 are not opposite of the polarization to the transmit antenna 810, the displacer 905 can be omitted. For example, in the LIDAR sensor system 900, the displacer 905 can displace the return beam 755 in the opposite polarization to the transmit beam 735 by a fixed amount. However, in the LIDAR sensor system 1100, the displacement of the return beam 755 it is not needed when the polarizations 780, 785, 795 are the same.

Figure 12:
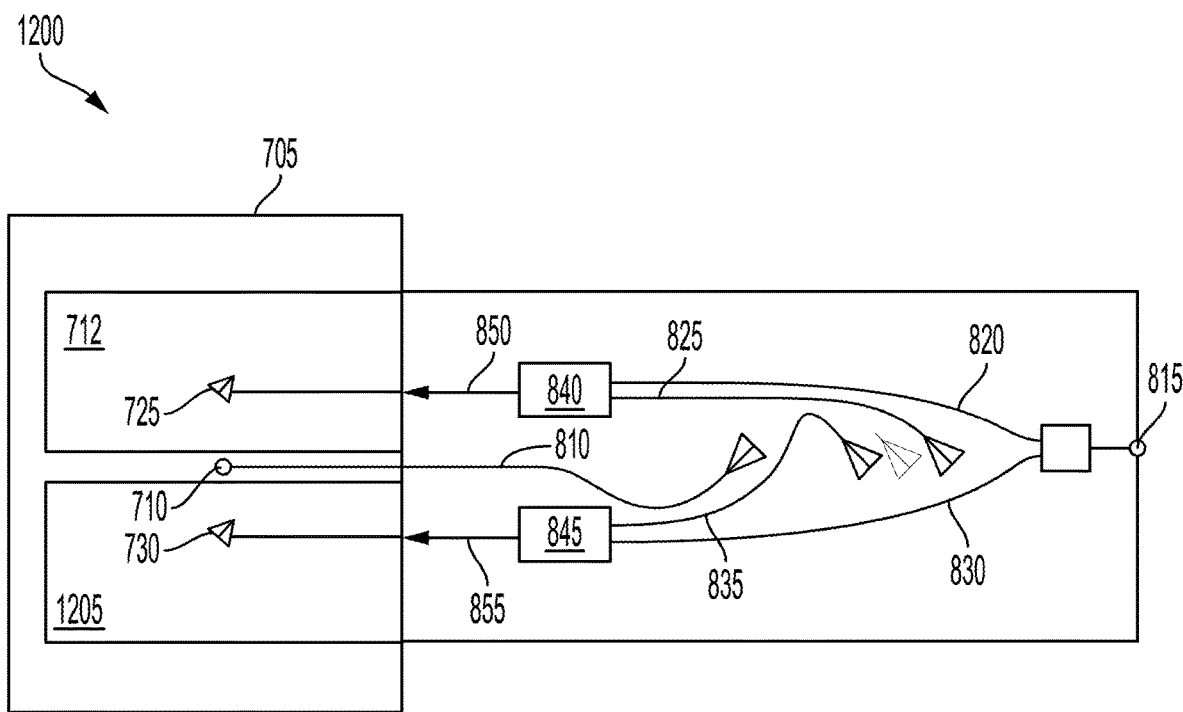
FIG. 12 is a block diagram of an example of optical components of a system.

FIG. 12 is a block diagram of an example of optical components of a system 1200. The system 1200 can include components of and/or be used to implement various LIDAR sensor systems described herein, such as the transmitter 710 and the receiver 712. For example, the system 1200 can be used to implement a receiver of a single polarization, and a switched local oscillator.

The system 1200 is similar to the system 800. However, the mixers 840, 845 are in communication with two independent and balanced photodetectors, instead of the single photodetector, e.g., the receiver 712, with two photodiodes, e.g., the grating couplers 725, 730. As such, the system 1200 can include a receiver 1205, e.g., a second receiver. The receiver 1205 can include the grating coupler 730. The receiver 712 can include the grating coupler 725. The mixer 840 can provide the signal 850 to the receiver 712, similar to the system 800. However, in the system 1200, the mixer 845 can provide the signal 855 to the receiver 1205.

In the system 1200, the local oscillator 815 can be passively split between the mixer 840 and the mixer 845. For example, the local oscillator 815 can actively switch the LO signal between the mixer 840 and the mixer 845 based on the scanning direction of the scanner 740. For example, the local oscillator 815 can transmit the reference beam 820, e.g., the first LO signal, to the mixer 840. For example, the local oscillator 815 can transmit the reference beam 830, e.g., the second LO signal, to the mixer 845.

Figure 13:
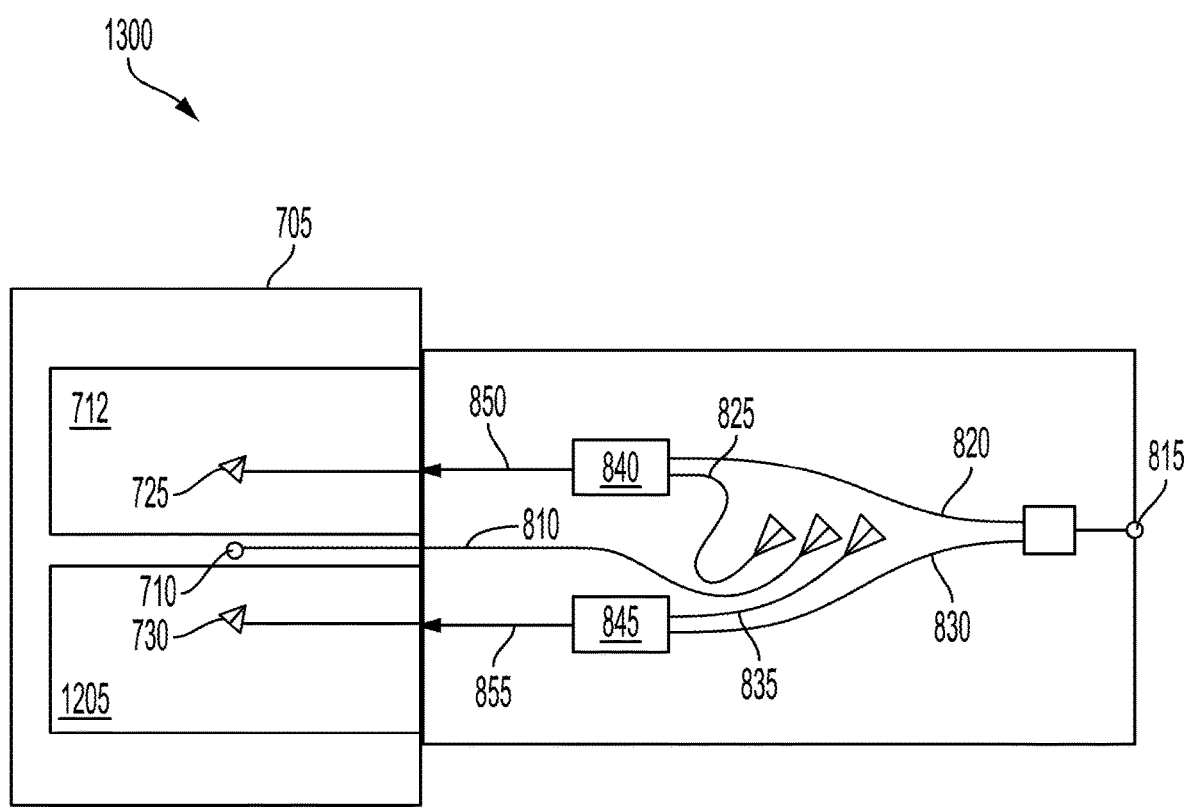
FIG. 13 is a block diagram of an example of optical components of a system.

FIG. 13 is a block diagram of an example of optical components of a system 1300. The system 1300 can include components of and/or be used to implement various LIDAR sensor systems described herein, such as the transmitter 710 and the receiver 712. For example, the system 1300 can be used to implement a receiver of a single polarization, and a switched local oscillator.

The system 1300 is similar to the system 1000 such that the displacer 905 can be omitted during operation. However, similar to the system 1200, the mixers 840, 845 are in communication with two independent and balanced photodetectors, instead of the single photodetector, e.g., the receiver 712, with two photodiodes, e.g., the grating couplers 725, 730. As such, the system 1300 can include the receiver 1205. The receiver 1205 can include the grating coupler 730. The receiver 712 can include the grating coupler 725. The mixer 840 can provide the signal 850 to the receiver 712, similar to the system 800. However, in the system 1300, the mixer 845 can provide the signal 855 to the receiver 1205. Further, similarly to the system 1200, the local oscillator 815 can be passively split between the mixer 840 and the mixer 845.

Figure 14:
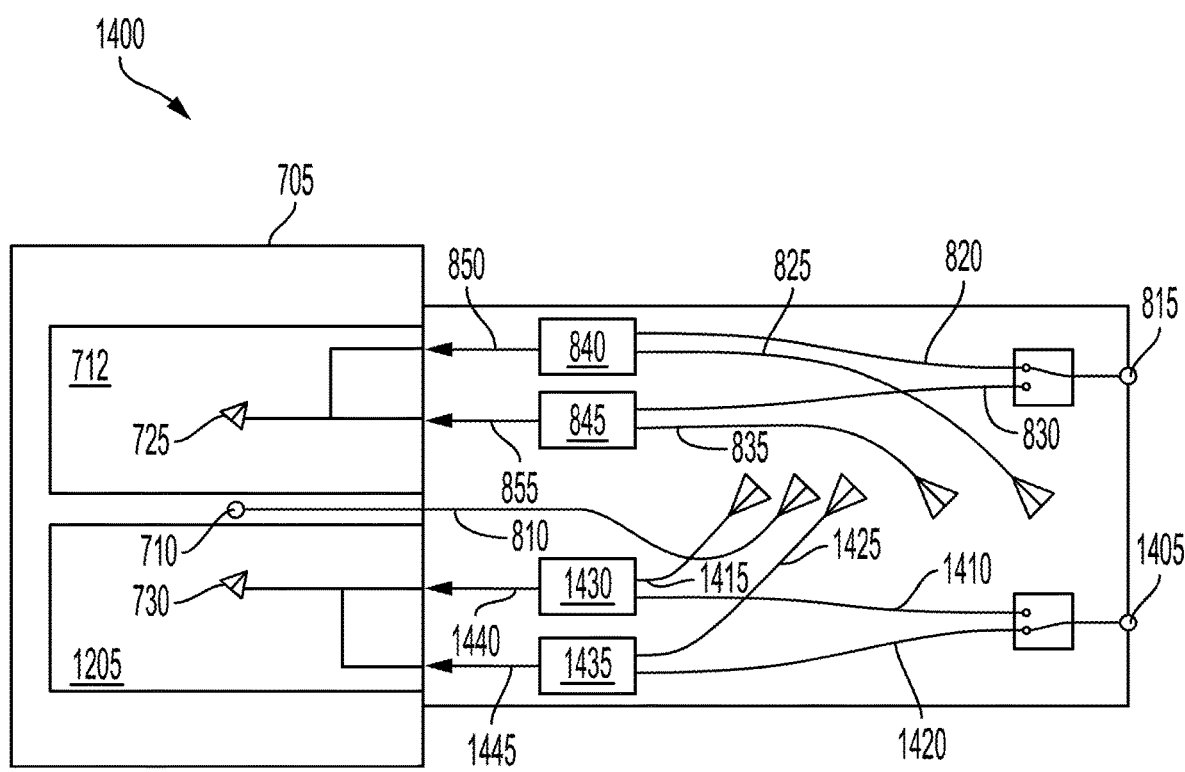
FIG. 14 is a block diagram of an example of optical components of a system.

FIG. 14 is a block diagram of an example of optical components of a system 1400. The system 1400 can include components of and/or be used to implement various LIDAR sensor systems described herein, such as the transmitter 710 and the receiver 712. For example, the system 1400 can be used to implement a receiver of a single polarization, and a switched local oscillator.

The system 1400 is a combination of the system 800 and the system 1000. As such, the system 1400 can include two separate local oscillators. For example, the system 1400 can include the local oscillator 815 and a local oscillator 1405, e.g., a second local oscillator. The local oscillator 1405 can function similar to or the same as the local oscillator 815. For example, the local oscillator 1405 can output LO signals. For example, the local oscillator 1405 can actively switch the LO signal between at least to mixers based on the scanning direction of the scanner 740. For example, the local oscillator 1405 can output a third LO signal and a fourth LO signal. The LO signals can be similar to or the same as reference beam 512. For example, the local oscillator 1405 can transmit the third LO signal, e.g., a reference beam 1410. For example, the local oscillator 1405 can transmit the fourth LO signal, e.g., a reference beam 1420. By the local oscillator 1405 switching the LO signal, the amount of power required by the local oscillator 1405 can be reduced.

The system 1400 can include a receive antenna 1415 and a receive antenna 1425. The receive antennas 1415, 1425 are similar to the receive antennas 825, 835. For example, the receive antennas 1415, 1425 can receive the return beam 755, as discussed more below.

The system 1400 can include a mixer 1430 and a mixer 1435. The mixers 1430, 1435 can be similar to or the same as the mixers 840, 845. The mixers 1430, 1435 can receive signals, as discussed more below. The mixer 1430 can output a signal 1440, as discussed more below. The mixer 1435 can output a signal 1445, as discussed more below.

Figure 15:
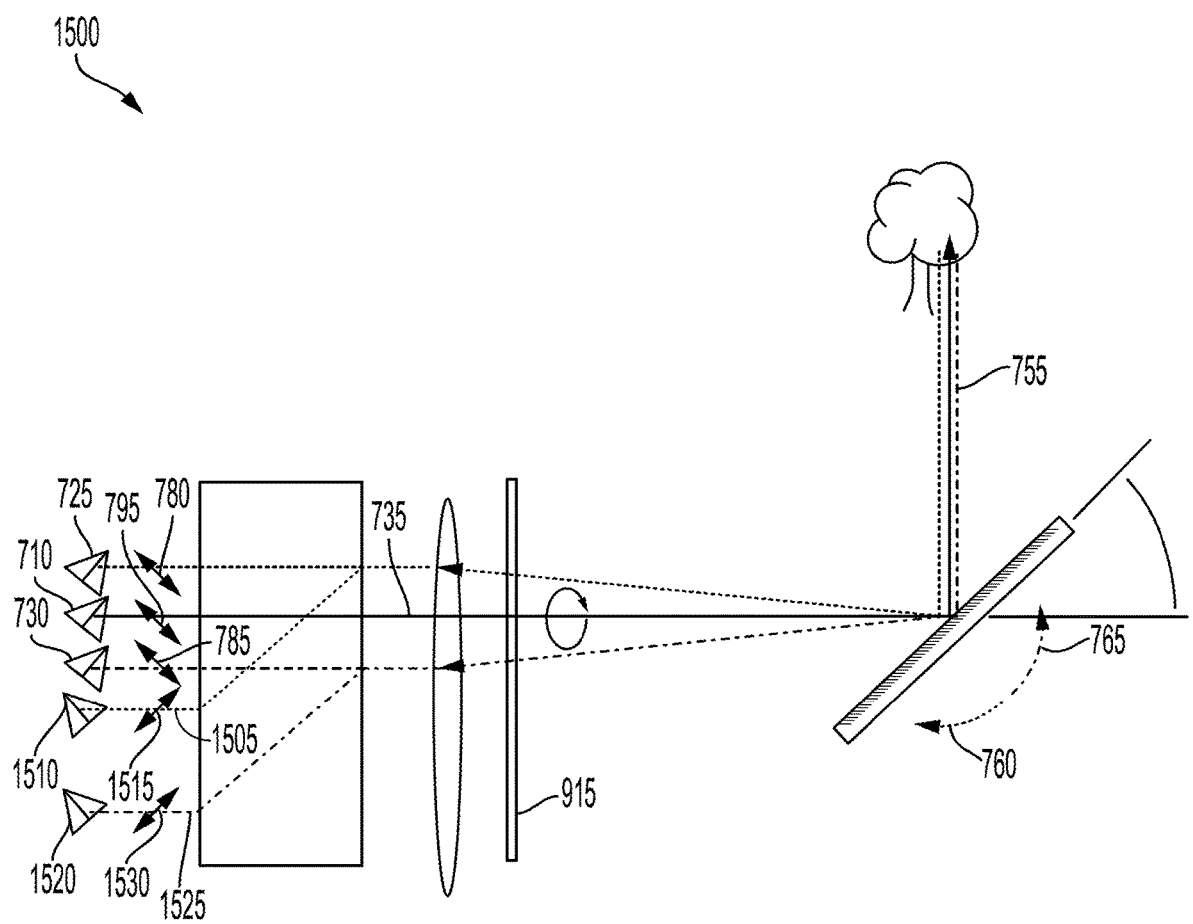
FIG. 15 is a block diagram of an example of a LIDAR sensor system including the optical components of FIG. 14.

FIG. 15 is a block diagram of an example of a LIDAR sensor system 1500 including the optical components of FIG. 14. The LIDAR sensor system 1500 can incorporate features of the LIDAR sensor system 500 and optic module 524 described with reference to FIGS. 5 and 6, respectively. The LIDAR sensor system 1500 can facilitate pitch-catch compensation, i.e. accounting for time delays or other offsets resulting from the round-trip path of the transmit beam outputted from the LIDAR sensor system 1500, reflected or otherwise scattered by object(s), and then returned as the return beam to the LIDAR sensor system 1500 for detection and processing, which might otherwise affect characteristics of the LIDAR sensor system 1500 such as signal-to-noise ratio.

The LIDAR sensor system 1500 can include the displacer 905 and the collimator 604, similar to the system 800 depicted in FIG. 8. However, in the system 1400, the LIDAR sensor system 1500 can include the wave plate 915. The wave plate 915 can be a quarter wave plate. The transmit beam 735 can pass unaffected through the wave plate 915. The wave plate 915 can induce circular polarization. For example, the wave plate 915 can circularly polarize components of the return beam 755.

The LIDAR sensor system 1500 can include a grating coupler 1510 and a grating coupler 1520. The grating couplers 1510, 1520 can receive the return beam 755 provided by the scanner 740. For example, the grating coupler 1510 can receive a third component 1505 of the return beam 755 provided by the scanner 740. For example, the grating coupler 1520 can receive a fourth component 1525 of the return beam 755 provided by the scanner 740. The third component 1505 of the return beam 755 can be at a third polarization 1515. The fourth component 1525 of the return beam 755 can be at a fourth polarization 1530.

As discussed above, the LIDAR sensor system 1500 can include the receive antenna 1415 and the receive antenna 1425 of the receiver 1205. The receive antenna 1415 can be implemented by the grating coupler 1510 of the receiver 712. For example, the receive antenna 1415 can be an optical antenna integrated onto the chip 705. The receive antenna 1415 can couple the third component 1505 of the return beam 755 onto the chip 705 from free space. The receive antenna 1415 can be oriented at an angle relative to a surface on which the receive antenna 1415 is provided corresponding to the third polarization 1515 of the third component 1505 of the return beam 755. The receive antenna 1425 can be implemented by the grating coupler 1520 of the receiver 712. For example, the receive antenna 1425 can be an optical antenna integrated onto the chip 705. The receive antenna 1425 can couple the fourth component 1525 of the return beam 755 onto the chip 705 from free space. The receive antenna 1425 can be oriented at an angle relative to a surface on which the receive antenna 1425 is provided corresponding to the fourth polarization 1530 of the fourth component 1525 of the return beam 755.

The receive antenna 1415 can receive the return beam 755. For example, the receive antenna 1415 can receive the third component 1505 of the return beam 755. As such, the receive antenna 1415 can be oriented at the same polarization as the third component 1505 of the return beam 755. For example, the receive antenna 1415 can have the same polarization as the third polarization 1515. The receive antenna 1415 can provide the third component 1505 of the return beam 755 to the mixer 1430.

The receive antenna 1425 can receive the return beam 755. For example, the receive antenna 1425 can receive the fourth component 1525 of the return beam 755. As such, the receive antenna 1425 can be oriented at the same polarization as the fourth component 1525 of the return beam 755. For example, the receive antenna 1425 can have the same polarization as the fourth polarization 1530. The receive antenna 1425 can provide the fourth component 1525 of the return beam 755 to the mixer 1435.

As discussed above, the mixers 1430, 1435 can receive signals. For example, the mixer 1430 can receive the reference beam 1410, e.g., the third LO signal. For example, the mixer 1430 can receive the third component 1505 of the return beam 755 from the receive antenna 1415. For example, the mixer 1435 can receive the reference beam 1420, e.g., the fourth LO signal. For example, the mixer 1435 can receive the fourth component 1525 of the return beam 755 from the receive antenna 1425.

As discussed above, the mixers 1430, 1435 can output signals. For example, the output signals can be based on the signals that each of the mixers 1430, 1435 received from the receive antennas 1415, 1425, respectively. For example, the output signals can be based on the signals that each of the mixers 1430, 1435 received from the local oscillator 1405. For example, the mixers 1430, 1435 can output signals responsive to the return beam 755 and the reference beams 1410, 1420. For example, the mixers 1430, 1435 can mix the return beam 755 and the reference beams 1410, 1420 and each output a signal.

The mixer 1430 can output the signal 1440. The signal 1440 can be responsive to and based on the third component 1505 of the return beam 755 and the reference beam 1410. The mixer 1435 can output the signal 1445. The signal 1445 can be responsive to and based on the fourth component 1525 of the return beam 755 and the reference beam 1420. The mixers 1430, 1435 can provide the signals 1440, 1445 to two photodiodes, e.g., the grating couplers 1510, 1520, respectively. The two photodiodes can have two physically separate optical inputs such that the mixers 1430, 1435 can provide the signals 1440, 1445 to a single photodetector. For example, the mixers 1430, 1435 can provide the signals 1440, 1445 to the receiver 1205.

Figure 16:
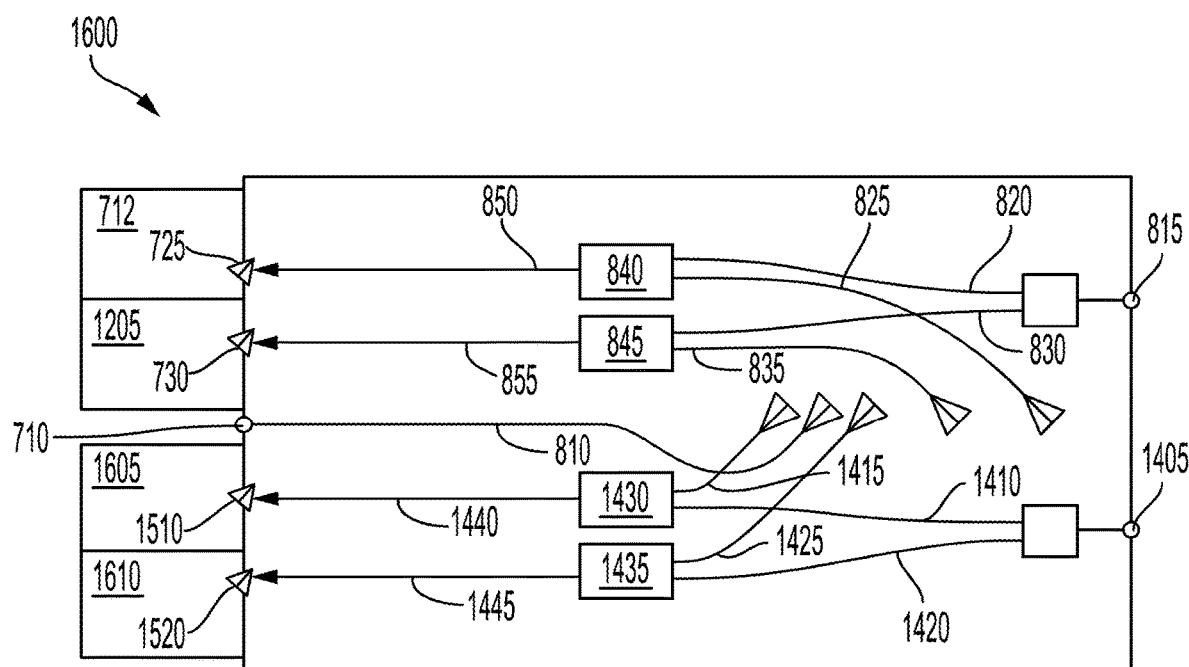
FIG. 16 is a block diagram of an example of optical components of a system.

FIG. 16 is a block diagram of an example of optical components of a system 1600. The system 1600 can include components of and/or be used to implement various LIDAR sensor systems described herein, such as the transmitter 710 and the receiver 712. For example, the system 1600 can be used to implement a receiver of a single polarization, and a switched local oscillator.

The system 1600 is similar to the system 1400. However, similarly to the system 1200, the mixers 1430, 1435 are in communication with two independent and balanced photodetectors, instead of the single photodetector, e.g., the receiver 1205. As such, the system 1600 can include a receiver 1605, e.g., a third receiver, and a receiver 1610 e.g., a fourth receiver. The receiver 1605 can include the grating coupler 1510. The receiver 1610 can include the grating coupler 1520. Additionally, the receiver 712 can include the grating coupler 725 and the receiver 1205 can include the grating coupler 730. The mixer 840 can provide the signal 850 to the receiver 712. The mixer 845 can provide the signal 855 to the receiver 1205. The mixer 1430 can provide the signal 1440 to the receiver 1605. The mixer 1435 can provide the signal 1445 to the receiver 1610.

3.2 LIDAR Sensor System Including Circulator

As discussed above, the LIDAR sensor system 500 can use various optical components to generate, encode information onto, and output light to be reflected or otherwise scattered by objects in the environment around the LIDAR sensor system 500. This can include, for example, at least some transmission of the light through free space between components of the LIDAR sensor system 500, including in implementations in which the light is provided from a laser source and modulated in frequency and/or phase using on-chip components, and then directed off of the chip by collimation and/or circulator optics to scanning optics to be directed into the environment. Systems and methods in accordance with the present disclosure can implement various such components to perform free-space optical transmission, maintain or improve signal-to-noise ratio, and reduce the overall size of the circulator.

Figure 17:
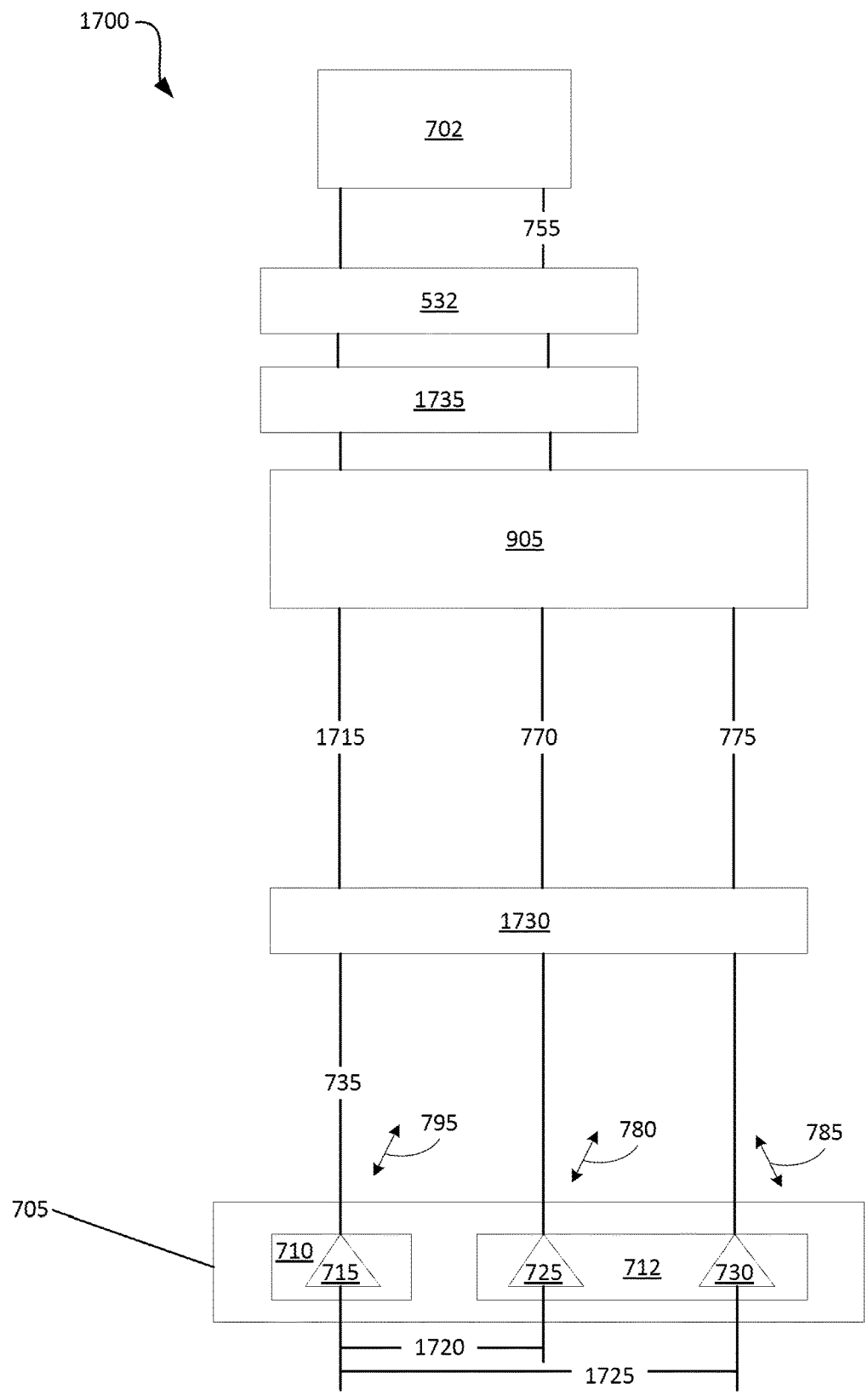
FIG. 17 is a block diagram of an example of a circulator.

FIG. 17 depicts a block diagram of a circulator 1700, which can be implemented in various LIDAR sensor systems described herein, such as the LIDAR sensor system 500 and the optics module 524. The circulator 1700 can by implemented by the chip 705. The chip 705 can include the transmitter 710 and the grating coupler 715. The transmitter 710 can output the transmit beam 735. The transmit beam 735 can be associated with a polarization. For example, the transmit beam 735 can be associated with the transmit polarization 795. The transmitter 710 can be positioned on the chip 705. For example, the transmitter 710 can be on the chip 705 and can output the transmit beam 735 out of a plane of the chip 705.

The chip 705 can include the receiver 712. The receiver 712 can include the grating coupler 725. The grating coupler 725 can be spaced by a spacing 1720 from the transmitter 710. The spacing 1720 between the grating coupler 725 and the transmitter 710 can be between about 8 micrometers and about 20 micrometers. The spacing 1720 between the grating coupler 725 and the transmitter 710 can be between about 12 micrometers and about 16 micrometers. For example, the spacing 1720 can be 14 micrometers. The spacing 1720 can correspond to the time delay associated with the first target range for detecting the object 702, as previously discussed. For example, the grating coupler 725 is positioned such that the grating coupler 725 aligns with the translation due to the time delay of the first component 770 of the return beam 755. The receiver 712 can include the grating coupler 730. The grating coupler 730 can be spaced by a spacing 1725 from the transmitter 710. The spacing 1725 between the grating coupler 730 and the transmitter 710 can be between about 30 micrometers and about 50 micrometers. The spacing 1725 between the grating coupler 730 and the transmitter 710 can be between about 32 micrometers and about 36 micrometers. For example, the spacing 1725 can be 34 micrometers.

The circulator 1700 can include the optics 532, e.g., one or more scanning optics. The optics 532 can have a scan axis (e.g., axis 534 described with reference to FIG. 5) about which the optics 532 rotate. The grating coupler 725 and the grating coupler 730 can be along the scan axis.

The circulator 1700 can be similar to or the same as the circulator 528. The circulator 1700 includes a wave plate 1730. The wave plate 1730 can be made from a birefringent material, e.g., quartz or a plastic, for which the index of refraction can be different for various polarizations of light along at least one particular axis through the material. The wave plate 1730 can be positioned between the transmitter 710 and the optics 532. The wave plate 1730 can be a half-wave plate. For example, with the wave plate 1730 being a half-wave plate, the wave plate 1730 can shift or rotate the polarization direction of linearly polarized light. As compared with operation of the wave plate 915, the wave plate 1730 can rotate the transmit polarization 795. For example, the wave plate 1730 can rotate the transmit polarization 795 by 45 degrees.

The circulator 1700 includes the displacer 905. The displacer 905 can be positioned between the wave plate 1730 and the optics 532. The displacer 905 can be made of various materials, such as birefringent materials including but not limited to $YVO_4$, optically configured to control the path of light through the displacer 905 based on polarization of the light. The thickness of the displacer 905 can be selected based on target amounts of displacement and the type of material used for the displacer 905.

For example, the displacer 905 can be made of $LiNbO_3$. The displacer 905 can have a thickness between about 0.5 millimeters and 0.7 millimeters. For example, the displacer 905 can have a thickness of 0.6 millimeters. The displacer 905 can displace the return beam 755. For example, as the return beam 755 provided by the object 702 contacts the displacer 905, one of the two different refractive indices of the displacer 905 can displace a portion, e.g., the second component 775, of the return beam 755.

The displacer 905 can displace the second component 775 of the return beam 755. For example, the displacer 905 can displace the second component 775 of the return beam 755 such that the second component 775 is between about 32 micrometers and about 36 micrometers from the rotated transmit beam 1715. For example, the displacer 905 can displace the second component 775 of the return beam 755 such that the second component 775 is 34 micrometers from the rotated transmit beam 1715. For example, the displacer 905 can displace the second component 775 of the return beam 755 by between about 18 micrometers and about 22 micrometers. For example, the displacer 905 can displace the second component 775 of the return beam 755 by 20 micrometers. For example, the displacer 905 can displace the second component 775 of the return beam 755 by 20 micrometers such that the second component 775 is 20 micrometers from the first component 770 of the return beam 755. Thus, since the second component 775 of the return beam 755 is displaced by about 18 and 22 micrometers, the spacing 1725 between the grating coupler 730 and the transmitter 710 can be such that the grating coupler 730 can be positioned to receive the second component 775 of the return beam 755. For example, the spacing 1725 between the grating coupler 730 and the transmitter 710 corresponds to the time delay and the displacement of the second component 775 relative to the first component 770 by the circulator 1700.

The circulator 1700 can include a wave plate 1735. The wave plate 1735 can be positioned between the displacer 905 and the optics 532. The wave plate 1735 can be used to address variations in the polarization of the rotated transmit beam 1715 from a target polarization.

The circulator 1700 can direct the transmit beam 735 to the optics 532. For example, the circulator 1700 can direct the transmit beam 735 to the optics 532 in a direction parallel with a plane of the chip 705. For example, the optics 532 can be tilted relative to the plane of the chip 705, e.g., at an angle greater than about 8 degrees, to reduce back reflections with respect to light passing in free space around the circulator 1700; the grating coupler 715 can be angled, e.g., by at least about 12 degrees, such that the optics 532 can be positioned parallel to the chip 705. Positioning the optics 532 parallel to the chip 705, e.g., the plane of the chip 706, can simplify mounting. For example, the parallel mechanical mounting of the optics 532 relative to chip 705 can facilitate manufacturing, such as by allowing the optics 532 and/or circulator 1700 to be coupled (e.g., bonded) directly to the chip 705.

The circulator 1700 can receive the transmit beam 735 and provide the transmit beam 735 to the optics 532. For example, the transmit beam 735 can pass through the wave plate 1730 and the displacer 905 and contact the optics 532. The circulator 1700 can receive the return beam 755 from reflection of the transmit beam 735 by the object 702. For example, the return beam 755 can contact the displacer 905. The circulator 1700 can split the return beam 755 into at least the first component 770 and the second component 775. For example, the circulator 1700 can split the return beam 755 into at least the first component 770 and the second component 775 via the displacer 905, as discussed above. The circulator 1700 can provide the first component 770 to the grating coupler 725 and the second component 775 to the grating coupler 730. For example, the first component 770 and the second component 775 can pass through the wave plate 1730 to the grating coupler 725 and the grating coupler 730, respectively.

The circulator 1700 can rotate the transmit beam 735 and provide the rotated transmit beam 1715 to the optics 532. For example, the transmit beam 735 can contact the wave plate 1730 and the wave plate 1730 can rotate the transmit beam 735. The wave plate 1730 can provide the rotated transmit beam 1715 to the displacer 905. The rotated transmit beam 1715 can pass through the displacer 905 unaffected and contact the optics 532.

The circulator 1700 can polarize the first component 770 of the return beam 755. For example, the return beam 755 can return from the object 702 unpolarized. The return beam 755 can contact the displacer 905. The displacer 905 can rotate, e.g., polarize, the first component 770 of the return beam 755 such that the polarization associated with the first component 770 corresponds with the polarization of the rotated transmit beam 1715. The first component 770 of the return beam 755 can contact the wave plate 1730. The wave plate 1730 can rotate, e.g., polarize, the first component 770 of the return beam 755 to provide the first component 770 at the first polarization 780. The wave plate 1730 can rotate, e.g., polarize, the first component 770 of the return beam 755 such that the first polarization 780 associated with the first component 770 corresponds with the transmit polarization 795 associated with the transmit beam 735. For example, the wave plate 1730 can rotate the first component 770 of the return beam 755 by 45 degrees.

The circulator 1700 can polarize the second component 775 of the return beam 755. For example, the return beam 755 can return from the object 702 unpolarized. The return beam 755 can contact the displacer 905. The displacer 905 can displace the second component 775 of the return beam 755, as discussed above. The displacer 905 can rotate, e.g., polarize, the second component 775 of the return beam 755 such that the polarization associated with the second component 775 is orthogonal to the polarization of the rotated transmit beam 1715. The second component 775 of the return beam 755 can contact the wave plate 1730. The wave plate 1730 can rotate, e.g., polarize, the second component 775 of the return beam 755 to provide the second component 775 at the second polarization 785. The wave plate 1730 can rotate, e.g., polarize, the second component 775 of the return beam 755 such that the second polarization 785 associated with the second component 775 is orthogonal to the transmit polarization 795 associated with the transmit beam 735. For example, the wave plate 1730 can rotate the second component 775 of the return beam 755 by 45 degrees. Since the polarization of the second component 775 is orthogonal to the first component 770 before the second component 775 and the first component 770 contact the wave plate 1730, the wave plate 1730 can rotate the second component 775 and the first component 770 each by 45 degrees in the same direction with the first polarization 780 and the second polarization 785 orthogonal to each other.

The circulator 1700 can provide the first component 770 of the return beam 755 with the first polarization 780 to the grating coupler 725. The circulator 1700 can provide the second component 775 of the return beam 755 with the second polarization 785 to the grating coupler 730. As discussed above, the grating coupler 725 and the grating coupler 730 can be rotated to correspond to the first polarization 780 and the second polarization 785, respectively, such as to be effectively aligned with the components 770, 775. The grating coupler 725 can receive at least a first threshold amount (e.g., greater than about thirty percent; between about thirty percent and about ninety percent; between about fifty percent and about eighty percent) of the first component 770 of the return beam 755. For example, the first threshold amount can correspond to an amount required by the grating coupler 725 to output a signal, e.g., the signal 850. The grating coupler 730 can receive at least a second threshold amount (e.g., greater than about thirty percent; between about thirty percent and about ninety percent; between about fifty percent and about eighty percent) of the second component 775 of the return beam 755. For example, the second threshold amount can correspond to an amount required by the grating coupler 730 to output a signal, e.g., the signal 855.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) sensor system for a vehicle, comprising:
    a transmitter configured to output a transmit beam;
    a receiver, comprising:
        a first receive grating coupler; and
        a second receive grating coupler;
    one or more scanning optics; and
    a circulator configured to:
        receive the transmit beam and provide the transmit beam to the one or more scanning optics;
        receive a return beam from reflection of the transmit beam by an object;
        split the return beam into at least a first component and a second component; and
        provide the first component to the first receive grating coupler and the second component to the second receive grating coupler.

2. The LIDAR sensor system of claim 1, wherein the transmit beam has a polarization, and the circulator is further configured to:
    rotate a polarization of the transmit beam and provide the rotated transmit beam to the one or more scanning optics;
    polarize the first component of the return beam such that a polarization of the first component corresponds with the polarization of the transmit beam;
    polarize the second component of the return beam such that a polarization of the second component is orthogonal to the polarization of the transmit beam; and
    rotate respective polarizations of the first component and the second component of the return beam by 45 degrees to provide the rotated first component to the first receive grating coupler and the rotated second component to the second receive grating coupler.

3. The LIDAR sensor system of claim 1, wherein the circulator comprises:
    a half-wave plate positioned between the transmitter and the one or more scanning optics; and
    a displacer positioned between the half-wave plate and the one or more scanning optics.

4. The LIDAR sensor system of claim 1, wherein the circulator comprises:
    a first half-wave plate positioned between the transmitter and the one or more scanning optics;
    a displacer positioned between the half-wave plate and the one or more scanning optics; and
    a second half-wave plate positioned between the displacer and the one or more scanning optics.

5. The LIDAR sensor system of claim 1, wherein:
    the first receive grating coupler is spaced from the transmitter by between about 8 micrometers and about 20 micrometers; and
    the second receive grating coupler is spaced from the transmitter by between about 30 micrometers and about 50 micrometers.

6. The LIDAR sensor system of claim 1, wherein:
    the first receive grating coupler is spaced from the transmitter by a first distance that corresponds to a time delay associated with a target range for detecting the object; and
    the second receive grating coupler is spaced from the transmitter by a second distance that corresponds to the time delay and a displacement of the second component relative to the first component by the circulator.

7. The LIDAR sensor system of claim 1, wherein:
    the one or more scanning optics have a scan axis relative to which the one or more scanning optics rotate; and
    the first receive grating coupler and the second receive grating coupler are located along the scan axis.

8. The LIDAR sensor system of claim 1, wherein:
    the first receive grating coupler receives at least about fifty percent of the first component of the return beam; and
    the second receive grating coupler receives at least about fifty percent of the second component of the return beam.

9. The LIDAR sensor system of claim 1, wherein the circulator comprises a displacer configured to displace the second component of the return beam relative to the first component of the return beam, the displacer made of a bi-refringent material.

10. The LIDAR sensor system of claim 1, wherein the circulator comprises:
    a displacer made of $LiNbO_3$ and having a thickness between about 0.53 millimeters and about 0.65 millimeters, the displacer positioned between the transmitter and the one or more scanning optics and configured to displace the second component of the return beam by between about 18 and about 22 micrometers.

11. The LIDAR sensor system of claim 1, wherein the transmitter is on a chip and is configured to output the transmit beam at an angle to a plane of the chip.

12. The LIDAR sensor system of claim 11, wherein the circulator is configured to direct the transmit beam to the one or more scanning optics in a direction parallel with the plane.

13. An autonomous vehicle control system, comprising:
a transmitter configured to output a transmit beam;
a receiver comprising a first receive grating coupler and a second receive grating coupler;
a scanner;
a circulator configured to:
 receive the transmit beam and direct the transmit beam to the scanner;
 receive a return beam from reflection of the transmit beam by an object;
 split the return beam into at least a first component and a second component; and
 direct the first component to the first receive grating coupler and the second component to the second receive grating coupler; and
one or more processors configured to:
 determine at least one of a range to the object or a velocity of the object based on the first component and the second component; and
 control operation of an autonomous vehicle responsive to the at least one of the range or the velocity.

14. The autonomous vehicle control system of claim 13, further comprising a modulator configured to apply at least one of frequency modulation or phase modulation to a beam the transmitter outputs as the transmit beam.

15. The autonomous vehicle control system of claim 13, wherein the transmit beam is has a polarization, and the circulator is further configured to:
 rotate a polarization of the transmit beam and provide the rotated transmit beam to the scanner;
 polarize the first component of the return beam such that a polarization of the first component corresponds with the polarization of the transmit beam;
 polarize the second component of the return beam such that a polarization of the second component is orthogonal to the polarization of the transmit beam; and
 rotate respective polarizations of the first component and the second component of the return beam by 45 degrees to provide the rotated first component to the first receive grating coupler and the rotated second component to the second receive grating coupler.

16. The autonomous vehicle control system of claim 13, wherein:
 the first receive grating coupler is spaced by a first distance from the transmitter, the first distance corresponds to a time delay associated with a target range for detecting the object; and
 the second receive grating coupler is spaced by a second distance from the transmitter, the second distance corresponds to the time delay and a displacement of the second component relative to the first component by the circulator.

17. The autonomous vehicle control system of claim 13, wherein:
 the first receive grating coupler receives at least about fifty percent of the first component of the return beam; and
 the second receive grating coupler receives at least about fifty percent of the second component of the return beam.

18. An autonomous vehicle, comprising:
a LIDAR sensor system, comprising:
 a transmit grating coupler configured to output a transmit beam;
 a first receive grating coupler;
 a second receive grating coupler;
 a scanner; and
 a circulator configured to:
  receive the transmit beam and provide the transmit beam to the scanner;
  receive a return beam from reflection of the transmit beam by an object;
  split the return beam into at least a first component and a second component; and
  direct the first component to the first receive grating coupler and the second component to the second receive grating coupler;
a steering system;
a braking system; and
a vehicle controller comprising one or more processors configured to:
 determine at least one of a range to the object or a velocity of the object using the first component and the second component; and
 control operation of at least one of the steering system and the braking system responsive to the at least one of the range or the velocity.

19. The autonomous vehicle of claim 18, wherein the transmit beam has a polarization, and the circulator is further configured to:
 rotate a polarization of the transmit beam and to provide the rotated transmit beam to the scanner;
 polarize the first component of the return beam such that a polarization of the first component corresponds with the polarization of the transmit beam;
 polarize the second component of the return beam such that a polarization of the second component is orthogonal to the polarization of the transmit beam; and
 rotate respective polarizations of the first component and the second component of the return beam by 45 degrees to provide the rotated first component to the first receive grating coupler and the rotated second component to the second receive grating coupler.

20. The autonomous vehicle of claim 18, wherein:
the first receive grating coupler receives at least about fifty percent of the first component of the return beam; and
the second receive grating coupler receives at least about fifty of the second component of the return beam.

* * * * *